US009891467B2

(12) United States Patent
Yanai et al.

(10) Patent No.: US 9,891,467 B2
(45) Date of Patent: Feb. 13, 2018

(54) LIQUID CRYSTAL DISPLAY DEVICE

(71) Applicant: FUJIFILM Corporation, Tokyo (JP)

(72) Inventors: Yujiro Yanai, Kanagawa (JP); Yukito Saitoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/388,839

(22) Filed: Dec. 22, 2016

(65) Prior Publication Data
US 2017/0123267 A1 May 4, 2017

Related U.S. Application Data

(62) Division of application No. PCT/JP2015/063441, filed on May 11, 2015.

(30) Foreign Application Priority Data

Jun. 30, 2014 (JP) .................................. 2014-134590

(51) Int. Cl.
G02F 1/1335 (2006.01)
G02F 1/13363 (2006.01)
(52) U.S. Cl.
CPC .... G02F 1/133536 (2013.01); G02F 1/13363 (2013.01); G02F 1/133621 (2013.01);
(Continued)
(58) Field of Classification Search
CPC ......... G02F 1/133536; G02F 1/133621; G02F 1/13363; G02F 2001/133543;
(Continued)

(56) References Cited

U.S. PATENT DOCUMENTS 6,295,106 B1 * 9/2001 Fukuzawa ......... G02F 1/133603
349/159
2011/0216271 A1 * 9/2011 Suzuki ............... G02F 1/13362
349/71

FOREIGN PATENT DOCUMENTS

JP H01-133003 A 5/1989
JP H09-506984 A 7/1997
(Continued)

OTHER PUBLICATIONS

International Search Report issued in PCT/JP2015/063441 dated Jul. 21, 2015.
(Continued)

Primary Examiner — Nathanael R Briggs
(74) Attorney, Agent, or Firm — Edwards Neils LLC; Jean C. Edwards, Esq.

(57) ABSTRACT

A liquid crystal display device includes a backlight that emits unpolarized blue light, a reflective polarizing layer which is provided on an emission side of the backlight and converts blue light to linearly polarized light, a quantum rod layer which is provided on a blue linearly polarized light emission side of the reflective polarizing layer and converts blue linearly polarized light to red linearly polarized light and green linearly polarized light using multiple quantum rods, and a liquid crystal panel disposed on a red linearly polarized light and green linearly polarized light emission side. In the quantum rod layer, a polarization direction of the blue linearly polarized light emitted from the reflective polarizing layer and a long axis direction of the quantum rods are parallel to each other.

9 Claims, 11 Drawing Sheets

(52) U.S. Cl.
CPC ............ *G02F 2001/133543* (2013.01); *G02F 2001/133614* (2013.01); *G02F 2001/133638* (2013.01); *G02F 2202/36* (2013.01); *G02F 2413/01* (2013.01); *G02F 2413/05* (2013.01)

(58) Field of Classification Search
CPC ..... G02F 2001/133638; G02F 2202/36; G02F 2413/01; G02F 2413/05
See application file for complete search history.

(56) References Cited

FOREIGN PATENT DOCUMENTS

| | | |
|---|---|---|
| JP | 2001-264756 A | 9/2001 |
| JP | 2009-047802 A | 3/2009 |
| JP | 2010-122382 A | 6/2010 |
| JP | 2012-502322 A | 1/2012 |
| JP | 2014-502403 A | 1/2014 |

OTHER PUBLICATIONS

Notification of Reasons for Refusal, issued by the Japanese Patent Office dated Jul. 25, 2017, in connection with corresponding Japanese Patent Application No. 2014-134590.

International Preliminary Report on Patentability issued by WIPO dated Jan. 12, 2017, in connection with International Patent Application No. PCT/JP2015/063441.

* cited by examiner

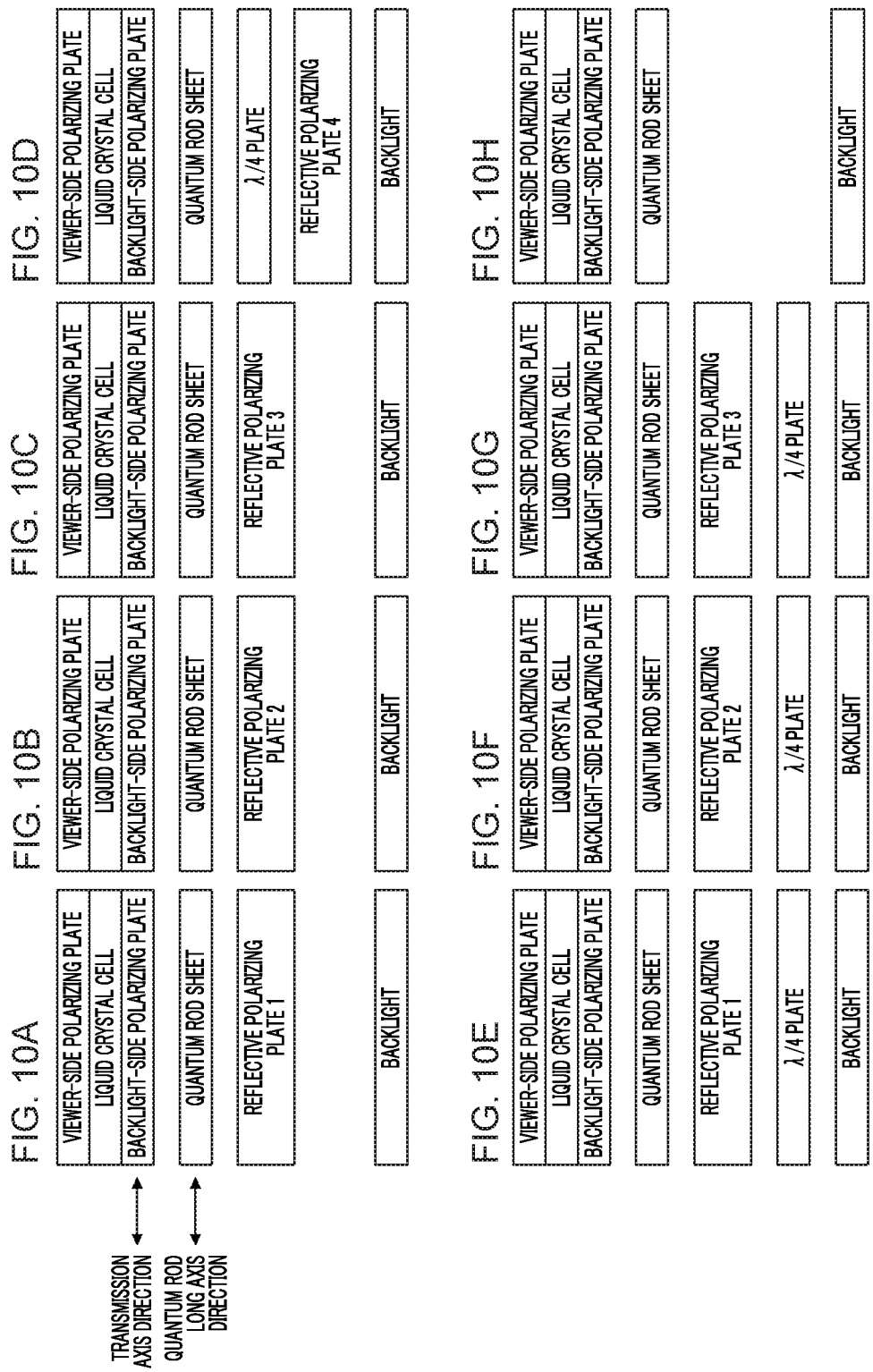

LIQUID CRYSTAL DISPLAY DEVICE

CROSS-REFERENCE TO RELATED APPLICATIONS

This application is a Continuation of PCT International Application No. PCT/JP2015/063441 filed on May 11, 2015, which was published under PCT Article 21(2) in Japanese, and which claims priority under 35 U.S.C. § 119(a) to Japanese Patent Application No. 2014-134590 filed on Jun. 30, 2014. The above applications are hereby expressly incorporated by reference, in their entirety, into the present application.

BACKGROUND OF THE INVENTION

1. Field of the Invention

The present invention relates to a liquid crystal display device in which blue light is used in a backlight and particularly to a liquid crystal display device in which the use efficiency of blue light from the backlight is increased and color reproducibility and brightness are improved.

2. Description of the Related Art

Liquid crystal display devices (hereinafter, also referred to as LCDs) have been used in a range that broadens every year as low-power consumption and space-saving image display devices. Liquid crystal display devices have a constitution in which a backlight (hereinafter, also referred to as BL), a backlight-side polarizing plate, a liquid crystal cell, a display-side polarizing plate, and the like are provided in this order.

Recently, for liquid crystal display devices, development for power saving, high definition, and color reproducibility improvement has been progressing in order to improve LCD performance At the moment, the demand for power saving, high definition, and color reproducibility improvement is intense for small-size devices such as table PCs and smartphones; however, even for large-size devices, development for next-generation high-definition televisions (4K2K, European Broadcasting Union (EBU) ratio of 100% or higher) of the current TV standards (FHD, National Television System Committee (NTSC) ratio of 72%≈EBU ratio of 100%) is progressing. Therefore, there is an intensifying demand for power saving, high definition, and color reproducibility improvement in liquid crystal display devices.

In order to increase the light use efficiency in response to the power saving of backlights, there are cases in which an optical sheet member is provided between a backlight and a backlight-side polarizing plate. The optical sheet member refers to an optical element that, out of incident light rays vibrating in all directions, only transmits light rays vibrating in a specific polarization direction and reflects light rays vibrating in the other polarization directions. As a core component of low-power LCDs which are widely used in accordance with the broad distribution of mobile devices and a decrease in the power consumption of home appliances, the optical sheet member is expected to solve the low light use efficiency of LCDs and thus increase brightness (the degree of the brightness of a light source per unit area).

Regarding the above-described optical sheet member, a technique in which a specific optical sheet member, for example, a dual brightness enhancement film (DBEF) or the like is provided between a backlight and a backlight-side polarizing plate, thereby improving the light use efficiency of the BL by means of light recycling and improving the brightness while saving the power of the backlight is known (refer to JP1997-506984A (JP-H09-506984A)). Similarly, JP1989-133003A (JP-H01-133003A) describes a polarizing plate having a constitution in which a λ/4 plate and a cholesteric liquid crystal phase are laminated together. When the bandwidth is broadened using a layer obtained by fixing three or more cholesteric liquid crystal phases in which the pitches of the cholesteric phases are different from each other, it is possible to improve the light use efficiency of the BL by means of light recycling. However, the above-described optical sheet member has a complex member constitution, and thus, in order to distribute the optical sheet member in the market, it has become essential to reduce the costs by decreasing the number of members by means of the additional function integration among the members.

In addition, in a display system of JP2014-502403A, an optical active structure including nanorods is irradiated with short-wavelength unpolarized light (wavelength $\lambda 0$) ejected from a pumping light source, and thus the optical active structure ejects polarized light having a color gamut necessary for display devices (for example, wavelengths $\lambda 1$, 80 2, and $\lambda 3$). The polarized light ejected from the structure passes through an optical polarizer, then, passes through a liquid crystal structure, and passes through a polarizer. A liquid crystal panel can be disposed between two glass plates capable of including an RGB filter and a polarizer (not illustrated) attached to the RGB filter. A polarization state having a higher degree of polarization can be obtained using a polarizer. In addition, in the display system, one or more optical elements such as diffusers, brightness enhancement films (BEFs) or dual brightness enhancement films (DBEFs) are provided, the diffusers make the optical distribution spatially uniform, and, in a case in which the diffusers are directly optically attached to the structure, the diffusers aid light extraction from the structure. When light is reused using a brightness enhancement film and a dual brightness enhancement film, brightness can be improved.

SUMMARY OF THE INVENTION

The above-described constitutions of JP1997-506984A (JP-H09-506984A) and JP1989-133003A (JP-H01-133003A) for improving light use efficiency has a multilayer constitution for imparting a broad range of light recycling function to white light and a complex structure in consideration of the wavelength dispersibility of the members, but it is not possible to satisfy both improvement in color reproducibility and improvement in brightness at the same time.

In addition, even in JP2014-502403A, an optical active structure including nanorods is provided, and, furthermore, a brightness enhancement film and a dual brightness intensification film are used, but these facts are not always sufficient for improving both color reproducibility and brightness.

An object of the present invention is to solve the problems derived from the above-described related art and provide a liquid crystal display device in which color reproducibility and brightness are improved.

In order to achieve the above-described object, the prevent invention provides a liquid crystal display device comprising: a backlight that emits unpolarized blue light; a reflective polarizing layer which is provided on an emission side of the backlight and converts blue light to linearly polarized light; a quantum rod layer which is provided on a blue linearly polarized light emission side of the reflective polarizing layer and converts blue linearly polarized light to red linearly polarized light and green linearly polarized light using multiple quantum rods; and a liquid crystal panel disposed on a red linearly polarized light and green linearly polarized light emission side, in which a polarization direction of the blue linearly polarized light emitted from the reflective polarizing layer and a long axis direction of the quantum rods are parallel to each other in the quantum rod layer.

The reflective polarizing layer preferably transmits light that is linearly polarized in a direction parallel to the long axis direction of the quantum rods and reflects light that is linearly polarized in a direction orthogonal to the long axis direction of the quantum rods.

It is preferable that the reflective polarizing layer is a reflective polarizing layer in which resins having different refractive indexes are laminated together.

It is preferable that the reflective polarizing layer has an interface having a varying refractive index, and a shape of the interface includes an uneven shape formed of protrusion portions and recess portions.

It is preferable that the reflective polarizing layer includes a cholesteric liquid crystal layer and a λ/4 plate disposed on a quantum rod layer side of the cholesteric liquid crystal layer.

It is preferable that a λ/4 plate is provided between the backlight and the reflective polarizing layer.

According to the present invention, it is possible to provide a liquid crystal display device in which color reproducibility and brightness are improved.

BRIEF DESCRIPTION OF THE DRAWINGS

FIGS. 10A to 10G are schematic views illustrating the constitutions of liquid crystal display devices of Examples 1 to 7, and FIG. 10H is a schematic view illustrating the constitution of a liquid crystal display device of Comparative Example 1.

DESCRIPTION OF THE PREFERRED EMBODIMENTS

Hereinafter, a liquid crystal display device of the present invention will be described in detail on the basis of preferred embodiments illustrated in the accompanying drawings.

Meanwhile, in the present invention, numerical ranges expressed using "to" include numerical values written on both sides. For example, in the case of x in a range of a numerical value α to a numerical value β, the range of x includes the numerical value α and the numerical value β, and x can be expressed as $\alpha \leq x \leq \beta$.

In addition, the "half-value width" of a peak refers to the width of the peak at a height of half the peak height.

In addition, angles (for example, angles of "90°" and the like) and relationships thereof (for example, "parallel", "orthogonal", and the like) include angles and relationships in error ranges permitted in technical fields to which the present invention belongs. For example, a specific angle refers to an angle in a range of the exact angle ±10° or less, and the error from the exact angle is preferably 5° or less and more preferably 3° or less. For example, members being parallel means that the angle between the members is in a range of 0°±10° (−10° to 10°).

Figure 1:
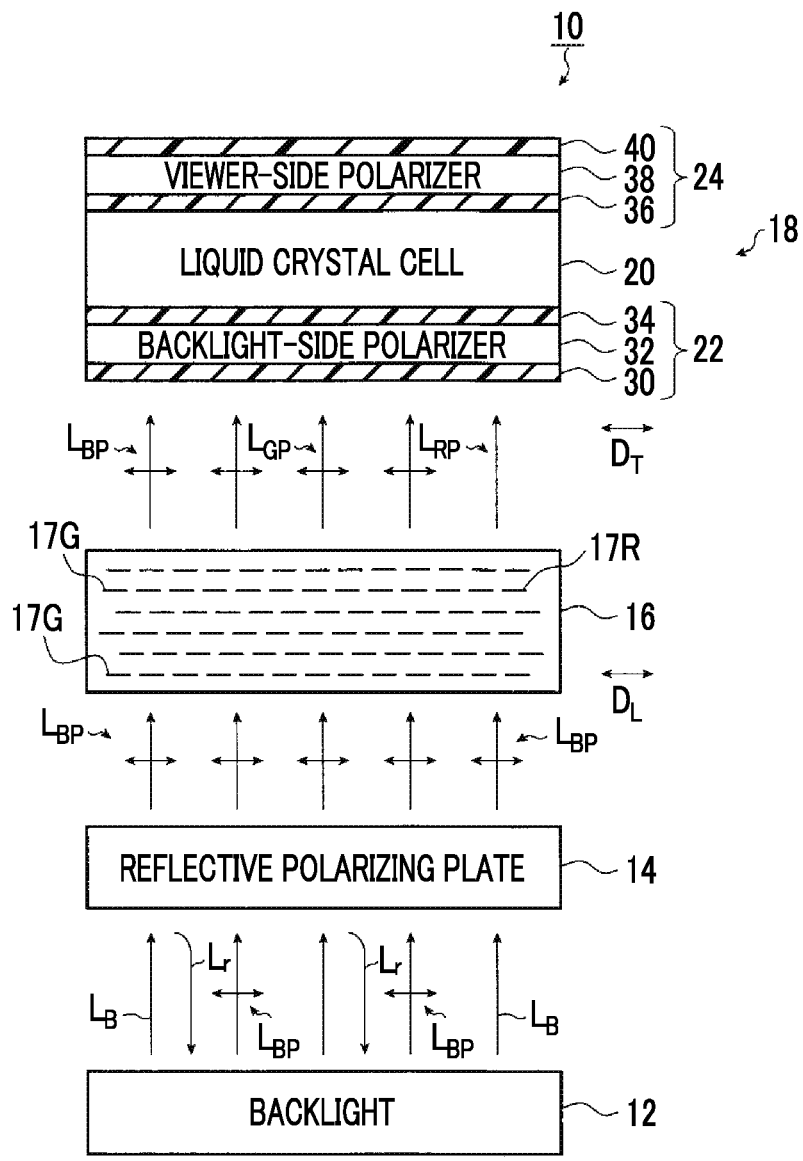
FIG. 1 is a schematic diagram illustrating a liquid crystal display device of a first embodiment of the present invention.

FIG. 1 is a schematic diagram illustrating a liquid crystal display device of a first embodiment of the present invention.

A liquid crystal display device 10 illustrated in FIG. 1 includes a backlight 12, a reflective polarizing plate 14, a quantum rod sheet 16, and a liquid crystal panel 18, and the respective portions of the reflective polarizing plate 14, the quantum rod sheet 16, and the liquid crystal panel 18 are sequentially disposed from the backlight 12 in an emission direction of unpolarized blue light $L_B$ emitted from the backlight 12.

The backlight 12 includes a surface light source (not illustrated) that emits the unpolarized blue light $L_B$. The blue light $L_B$ refers to light having a light emission central wavelength in a wavelength range of 430 to 480 nm. Meanwhile, the blue light $L_B$ preferably has a peak of the light emission intensity with a half-value width of 100 nm or less, more preferably has a peak of the light emission intensity with a half-value width of 80 nm or less, and particularly preferably has a peak of the light emission intensity with a half-value width of 70 nm or less.

The backlight 12 includes, for example, a light guide plate (not illustrated) intended to be used as a surface light source, a reflection member (not illustrated) capable of reflecting part or all of the light rays in a wavelength range of 430 to 480 nm, and the like.

The reflective polarizing plate 14 is provided on the emission side of the backlight 12 and functions as a reflective polarizing layer that converts the blue light $L_B$ to blue linearly polarized light $L_{BP}$. Furthermore, the reflective polarizing plate 14 preferably, for example, transmits a P wave and reflects an S wave when the unpolarized blue light $L_B$ is incident on the reflective polarizing layer. In this case, the P wave is linearly polarized light $L_{BP}$. Meanwhile, the reflected light $L_r$ of the reflected S wave is reflected by the reflection member (not illustrated) in the backlight 12 and is incident on the reflective polarizing plate 14. The use efficiency of the backlight 12 can be increased using the reflected light $L_r$ as well.

The reflective polarizing plate 14 is not particularly limited as long as the above-described function is satisfied. The reflective polarizing plate 14 will be described below in detail.

The quantum rod sheet 16 is provided on the blue linearly polarized light $L_{BP}$ emission side of the reflective polarizing plate 14 and functions as a quantum rod layer that converts blue linearly polarized light $L_{BP}$ to red linearly polarized light $L_{RP}$ and green linearly polarized light $L_{GP}$ using quantum rods 17G and 17R. The quantum rod sheet 16 transmits part of the blue linearly polarized light $L_{BP}$ and optically converts the rest of the blue linearly polarized light $L_{BP}$ to green linearly polarized light $L_{GP}$ and red linearly polarized light $L_{RP}$.

The green color refers to light having a light emission central wavelength in a wavelength range of 500 to 600 nm The red color refers to light having a light emission central wavelength in a wavelength range of longer than 600 nm and 650 nm or shorter.

The green linearly polarized light $L_{GP}$ and the red linearly polarized light $L_{RP}$ that can be obtained in the quantum rod sheet 16 preferably have a narrow half-value width from the viewpoint of color reproduction. Therefore, both the green linearly polarized light $L_{GP}$ and the red linearly polarized light $L_{RP}$ preferably have a peak of the light emission intensity with a half-value width of 100 nm or less, more preferably have a peak of the light emission intensity with a half-value width of 80 nm or less, and particularly preferably have a peak of the light emission intensity with a half-value width of 70 nm or less. Meanwhile, the quantum rod sheet 16 will be described below in detail.

The liquid crystal panel 18 includes a liquid crystal cell 20, a backlight-side polarizing plate 22, and a viewer-side polarizing plate 24, and the liquid crystal cell 20 is sandwiched between the backlight-side polarizing plate 22 and the viewer-side polarizing plate 24. As the liquid crystal panel 18, a well-known liquid crystal panel that displays images by changing the orientation state of liquid crystals by means of application of voltage can be appropriately used.

Therefore, the constitution of the liquid crystal cell 20 is not particularly limited, and a liquid crystal cell having an ordinary constitution can be employed. The liquid crystal cell includes, for example, a pair of substrates disposed opposite to each other and a liquid crystal layer sandwiched between the pair of substrates and may include a color filter layer or the like depending on the necessity of displaying color images or monochromatic images. The driving mode of the liquid crystal cell is also not particularly limited, and, a variety of modes such as the twisted nematic (TN) mode, the super twisted nematic (STN) mode, the vertical alignment (VA) mode, the in-plane switching (IPS) mode, and the optically compensated bend cell (OCB) mode can be used. The liquid crystal cell 20 preferably employs the VA mode, the OCB mode, the IPS mode, or the TN mode.

The backlight-side polarizing plate 22 includes polarizing plate protective films 30 and 34 laminated on a backlight-side polarizer 32, the constitution of the backlight-side polarizing plate 22 is not particularly limited, and a well-known constitution can be employed. For example, it is possible to employ an innerless constitution in which polarizing protective films are not provided on the inner side and an adhesive or a coated film is directly provided on a polarizer.

The viewer-side polarizing plate 24 includes polarizing plate protective films 36 and 40 laminated on a viewer-side polarizer 38, the constitution of the viewer-side polarizing plate 24 is not particularly limited, and a well-known constitution can be employed.

As the backlight-side polarizer 32 and the viewer-side polarizer 38, polarizers that are used in well-known liquid crystal panels can be used.

As the backlight-side polarizer 32 and the viewer-side polarizer 38, for example, polarizers obtained by adsorbing and orienting iodine to and in a polymer film are preferably used. The above-described polymer film is not particularly limited, and a variety of polymer films can be used. Examples thereof include hydrophilic polymer films such as polyvinyl alcohol-based films, polyethylene terephthalate-based films, ethylene-vinyl acetate copolymer-based films and partially-saponized films thereof, and cellulose-based films, polyene-based oriented films such as dehydrated substances of polyvinyl alcohol or hydrochloric acid-removed substances of polyvinyl chloride, and the like. Among these, polyvinyl alcohol-based films having an excellent property of being dyed with iodine as a polarizer are preferably used.

The thicknesses of the backlight-side polarizer 32 and the viewer-side polarizer 38 are not particularly limited and are, generally, approximately 1 to 100 µm, preferably 3 to 30 µm, and more preferably 5 to 20 µm.

Regarding the optical characteristics of the backlight-side polarizer 32 and the viewer-side polarizer 38, the unit body transmittance measured from the polarizer alone is preferably 43% or higher and more preferably in a range of 43.3% to 45.0%. In addition, the orthogonal transmittance measured by preparing the backlight-side polarizer 32 and the viewer-side polarizer 38 and superimposing the two polarizers together so that the absorption axes of the polarizers form 90° with each other is preferably smaller and is, practically, preferably 0.00% or higher and 0.050% or lower and more preferably 0.030% or lower. The degree of polarization is, practically, preferably 99.90% or higher and 100% or lower and more preferably 99.93% or higher and 100% or lower. The backlight-side polarizer and the viewer-side polarizer preferably have almost the same optical characteristics as described above even when the transmittance is measured from the polarizers as polarizing plates.

In the polarizing plate protective films 30 and 34 and the polarizing plate protective films 36 and 40, as the protective films disposed on a side opposite to the liquid crystal cell 20, a thermoplastic resin having excellent transparency, mechanical strength, thermal stability, moisture-shielding property, isotropy, and the like is used. Specific examples of the thermoplastic resin described above include cellulose resins such as triacetyl cellulose, polyester resins, polyether sulfone resins, polysulfone resins, polycarbonate resins, polyamide resins, polyimide resins, polyolefin resins, (meth) acryl resins, cyclic polyolefin resins (norbornene-based resins), polyarylate resins, polystyrene resins, polyvinyl alcohol resins, and mixtures thereof.

In the two polarizing plate protective films 30 and 34 in the backlight-side polarizing plate 22, at least the polarizing plate protective film 30 on a side opposite to the liquid crystal cell 20 is preferably a cellulose acylate film.

The thicknesses of the polarizing plate protective films 30 and 34 and the polarizing plate protective films 36 and 40 can be appropriately set and are generally approximately 1 to 500 µm from the viewpoint of workability such as strength or handling, a thin layer property, and the like. The thicknesses of the polarizing plate protective films 30 and 34 and the polarizing plate protective films 36 and 40 are, particularly, preferably 1 to 300 µm, more preferably 5 to 200 µm, and particularly preferably 5 to 150 µm.

Meanwhile, it is needless to say that the liquid crystal panel 18 may appropriately have a constitution of well-known liquid crystal panels such as a color filter, a thin layer transistor substrate including a thin layer transistor (hereinafter, also referred to as TFT), a lens film, a diffusion sheet, a hardcoat layer, an antireflection layer, a low-reflection layer, and an antiglare layer.

The characteristics of the color filter, pigments for the color filter, materials of black matrixes, the carrier concentration of TFT, and the like are appropriately selected depending on the required specification of the liquid crystal panel 18.

The backlight-side polarizer 32 is preferably disposed so that the transmission axis (not illustrated) of the backlight-side polarizer 32 becomes parallel to the vibration direction of the blue linearly polarized blue light $L_{BP}$, the green linearly polarized light $L_{GP}$, and the red linearly polarized light $L_{RP}$. That is, the backlight-side polarizer is preferably disposed so that the long axis direction $D_L$ (refer to FIG. 1) of the quantum rods 17G and 17R and the transmission axis direction $D_T$ (refer to FIG. 1) of the backlight-side polarizer 32 become parallel to each other.

In addition, it is preferable that the absorption axes (not illustrated) of the backlight-side polarizer 32 and the viewer-side polarizer 38 are orthogonal to each other, that is, the transmission axes (not illustrated) of the backlight-side polarizer 32 and the viewer-side polarizer 38 are orthogonal to each other.

In the liquid crystal display device 10, the backlight 12, the reflective polarizing plate 14, the quantum rod sheet 16, and the liquid crystal panel 18 may be disposed in contact with each other, may be disposed adjacent to each other through an adhesive layer and the outer-side polarizing plate protective film 30, or may be disposed away from each other through an air layer. In the liquid crystal display device 10, the backlight-side polarizing plate 22 is preferably disposed adjacent to the reflective polarizing plate through the outer-side polarizing plate protective film 30 since the light use efficiency of the unpolarized blue light $L_B$ emitted from the backlight 12 and the reflected light $L_r$ thereof are improved and thus the brightness is improved, or the light leakage of ultraviolet light or the blue light $L_B$ having a short wavelength is suppressed.

Next, the quantum rod sheet 16 will be described.

The quantum rod sheet 16 includes quantum rods that convert the wavelength of light and a polymer serving as a matrix that disperses the quantum rods.

The quantum rods are also referred to as semiconductor nanorods and are rod-shaped semiconductor nanocrystals (nanoparticles). The quantum rods have a rod shape and directionality and thus emit polarized light when light emitted from the light source is incident on the quantum rods. That is, the quantum rods are excited by incident excitation light and emit fluorescent light.

In the quantum rod sheet 16, the quantum rod 17G that emits green linearly polarized light $L_{GP}$ and the quantum rod 17R that emits red linearly polarized light $L_{RP}$ are dispersed in the polymer.

The quantum rods 17G and 17R have a needle shape, an oval shape, or a cubic shape and have a long axis. The quantum rod sheet 16 emits green linearly polarized light $L_{GP}$ and red linearly polarized light $L_{RP}$, and the polarization direction is parallel to the long axis direction $D_L$ of the quantum rods 17G and 17R. Therefore, in the quantum rods 17G and 17R, the long axes are preferably oriented in a previously-specified direction depending on the polarization direction.

As described above, when the quantum rods are oriented in a predetermined direction, it is possible to emit a certain amount of light that is linearly polarized in a desired vibration direction.

The method for confirming the long axis direction of the quantum rod is not particularly limited, and, generally, the long axis direction of the quantum rod can be confirmed by observing a cross-section of the quantum rod sheet using a microscope (for example, a transmission electron microscope). Alternatively, the long axis direction of the quantum rod can be measured by means of the polarization-measurement of the polarization state of light emitted from the quantum rod sheet 16 using, for example, Axoscan manufactured by Axometrics, Inc.

Meanwhile, the quantum rod sheet may include quantum rods having the long axis that is not parallel to a predetermined direction as long as the effects of the present invention are not impaired.

Only one kind of quantum rods may be used, or two or more kinds of quantum rods may be jointly used.

In a case in which two or more kinds of quantum rods are jointly used, two or more kinds of quantum rods having different light emission wavelengths may be used.

The shape of the quantum rod may be a shape extending in a single direction (a rod shape) or may be a so-called cylindrical shape, a quadrangular prism shape (preferably a cubic shape), a triangular prism shape, a hexagonal prism shape, or the like.

The average length (the average length in the long axis direction: the average long axis length) of the quantum rods is not particularly limited, but is preferably 8 to 500 nm and more preferably 10 to 160 nm since the light emission characteristics are superior, and a decrease in the light emission efficiency is suppressed.

Meanwhile, the above-described average length is a value obtained by measuring the lengths of the long axes of 20 or more arbitrarily-selected quantum rods using a microscope (for example, a transmission electron microscope) and arithmetically averaging the measured lengths.

In addition, the long axis of the quantum rod refers to the longest one of lines that traverse the quantum rod in a two-dimensional image of the quantum rod which is obtained by observing the quantum rod using a microscope (for example, a transmission electron microscope). The short axis refers to the shortest one of lines that are orthogonal to the long axis and traverse the quantum rod.

The average short axis length (the average value of short axes) of the quantum rod is not particularly limited, but is preferably 0.3 to 20 nm and more preferably 1 to 10 nm since the light emission characteristics are superior, and a decrease in the light emission efficiency is suppressed.

Meanwhile, the above-described average short axis length is a value obtained by measuring the diameters of 20 or more arbitrarily-selected quantum rods using a microscope (for example, a transmission electron microscope) and arithmetically averaging the measured lengths.

The aspect ratio (the long axis of the quantum rod/the short axis of the quantum rod) of the quantum rod is not particularly limited, but is preferably 1.5 or more and more preferably 3.0 or more since the light emission characteristics are superior, and a decrease in the light emission efficiency is suppressed. The upper limit is not particularly limited, but is 20 or less in many cases from the viewpoint of ease of handling.

Meanwhile, the aspect ratio is an average value and is a value obtained by measuring the aspect ratios of 20 or more arbitrarily-selected quantum rods using a microscope (for example, a transmission electron microscope) and arithmetically averaging the measured lengths.

In addition, the quantum rods 17G and 17R are constituted of, for example, a fluorescent material. Examples of the fluorescent material constituting the quantum rods 17G and 17R include yttrium-aluminum-garnet-based yellow fluorescent bodies, terbium-aluminum-garnet-based yellow fluorescent bodies, and the like. The fluorescence wavelength of the fluorescent material can be controlled by changing the particle diameters of the fluorescent body. Additionally, it is possible to use the fluorescent material described in Paragraph "0027" of JP2010-532005A. In addition, organic fluorescent materials can also be used, and it is possible to use, for example, the fluorescent material described in Paragraphs "0009" of JP2001-174636A and Paragraphs "0007" and the like of JP2001-174809A.

The quantum rod sheet 16 including an organic or inorganic fluorescent material, for example, a dye or a pigment is preferably a sheet in which the fluorescent material is oriented, a thermoplastic film in which the fluorescent material is dispersed and then stretched, or an adhesive layer in which the fluorescent material is dispersed and oriented.

The above-described quantum rods 17G and 17R are not particularly limited, and it is possible to use the oval or cubic quantum rod described in Row 36 in the fourth column to Row 5 in the sixth column in the specification of US2005/0211154A, a dissertation (Peng, X. G.; Manna, L.; Yang, W. D.; Wickham, j.; Scher, E.; Kadavanich, A.; Alivisatos, A. P. Nature 2000, 404, 59 to 61), and a dissertation (Manna, L.; Scher, E. C.; Alivisatos, A. P. j. Am. Chem. Soc. 2000, 122, 12700 to 12706), the contents of which are incorporated into the present invention. The shape and orientation state of the quantum rod can be confirmed using a transmission electron microscope.

Alternatively, the material constituting the quantum rod is not also limited to what has been described above, and the quantum rod may be constituted of a semiconductor. Examples thereof include II-VI semiconductors, III-V semiconductors, IV-VI semiconductors, and combinations thereof. More specifically, the material can be selected from CdS, CdSe, CdTe, ZnS, ZnSe, ZnTe, ZnO, GaP, GaAs, GaSb, HgS, HgSe, HgTe, InAs, InP, InSb, AlAs, AlP, AlSb, $Cu_2S$, $Cu_2Se$, $CuInS_2$, $CuInSe_2$, $Cu_2(ZnSn)S_4$, $Cu_2(InGa)S_4$, $TiO_2$ alloys thereof, and mixtures thereof.

The quantum rod may be a quantum rod made of a single component or a core/shell-type quantum rod having a core of a first semiconductor and a shell of a second semiconductor. In addition, a core/multiple shell-type quantum rod or a quantum rod in which shells form a core/shell constitution having a staircase composition can be used.

On the surface of the quantum rod, ligands may be coordinated as necessary. Examples of the ligand include phosphine and phosphine oxides such as trioctylphosphine oxide (TOPO), trioctylphosphine (TOP), and tributylphosphine (TBP); phosphonic acids such as dodecylphosphonic acid (DDPA), tridecylphosphonic acid (TDPA), and hexylphosphonic acid (HPA); amines such as dodecyl amine (DDA), tetradecyl amine (TDA), hexadecyl amine (HDA), and octadecyl amine (ODA); thiols such as hexadecanethiol and hexanethiol; mercapto carboxylic acids such as mercapto propionic acid and mercaptoundecanoic acid.

The kind of the polymer is not particularly limited, and a variety of resins that are used in well-known quantum rods can be used.

Here, in the quantum rod sheet 16, it is preferable that the moisture content is 1.0% or less and the oxygen permeability at a film thickness of 20 μm is 200 $cc/m^2 \cdot day \cdot atm$ or less.

The quantum rod sheet 16 preferably satisfies the above-described moisture content and oxygen permeability since a decrease in the light emission efficiency is suppressed, and a change in the degree of polarization in a hot and humid environment is suppressed.

Therefore, examples of the polymer exhibiting a predetermined moisture content and a predetermined oxygen permeability in the quantum rod sheet 16 include polyester-based resins (for example, polyethylene terephthalate and polyethylene naphthalate), (meth)acrylic resins, polyvinyl chloride-based resins, polyvinylidene chloride-based resins, and the like. Among these, polyester-based resins are preferred, and polyethylene terephthalate and polyethylene naphthalate are more preferred since at least one of the additional suppression of a decrease in the light emission efficiency and the additional suppression of a decrease in the degree of polarization in a hot and humid environment is satisfied.

Meanwhile, as a method for measuring the oxygen permeability, the method according to JIS K 7126 is carried out. Regarding the measurement conditions, the method is carried out at a temperature of 23° C. and a relative humidity of 50%. Meanwhile, the oxygen permeability is a value converted for a thickness of 20 μm.

In addition, the moisture content is a value obtained by measuring the moisture percentage of the quantum rod sheet which has been immersed in water for 24 hours at 23° C. according to International Organization for Standardization (ISO) 62 method1.

An example of a preferred aspect of the polymer is a polymer having a modulus of elasticity of 1,000 MPa or higher. The range of the modulus of elasticity is more preferably 3,000 MPa or higher. The upper limit is not particularly limited, but is 10,000 MPa or lower in many cases.

In a case in which the modulus of elasticity of the polymer is in the above-described range, the stretching or warping of the polymer is further suppressed even when stress is applied to the quantum rod sheet, the orientations of the quantum rods are not easily disarrayed, and the degree of polarization and the like do not easily change and do not easily become uneven.

The modulus of elasticity is measured using the method according to JIS K 7161.

The thickness of the quantum rod sheet 16 is not particularly limited, but is preferably 5 to 200 μm and more preferably 10 to 150 μm from the viewpoint of the handling property and the light emission characteristics.

Meanwhile, the above-described thickness refers to the average thickness, and the average thickness is obtained by measuring the thicknesses of an optical conversion film at ten or more arbitrary positions and arithmetically averaging the measured values.

In addition, the quantum rod sheet 16 may be disposed on a support. When disposed on a support, the quantum rod sheet is capable of reinforcing the mechanical strength of the optical conversion film. In addition, in a case in which the support is subjected to an stretching treatment, the support is preferably a support that can be stretched (stretchable support).

The kind of the support is not particularly limited, and a well-known support can be used. A material constituting the support is not particularly limited, and examples of the support include polyester-based resins (for example, polyethylene terephthalate and polyethylene naphthalate), polyolefin-based resins (for example, polyethylene and polypropylene), polystyrene-based resins, polycarbonate-based resins, (meth)acrylic-based resins, silicone-based resins, polyvinyl chloride-based resins, polyvinylidene chloride-based resins, and the like. Among these, polyester-based resins are preferred, and polyethylene terephthalate and polyethylene naphthalate are more preferred since the mechanical strength is excellent, and it is easy to apply the resins to stretching treatments.

The thickness of the support is not particularly limited, but is preferably 20 to 200 μm and more preferably 30 to 150 μm from the viewpoint of the handling property.

Meanwhile, the above-described thickness refers to the average thickness, and the average thickness is obtained by measuring the thicknesses of the support at ten or more arbitrary positions and arithmetically averaging the measured values.

In the liquid crystal display device 10, as illustrated in FIG. 1, the long axis direction $D_L$ of the quantum rods 17R and 17G are oriented to be parallel to the polarization direction of linearly polarized light $L_{BP}$ emitted from the reflective polarizing plate 14. Therefore, it is possible to decrease the loss of the linearly polarized light $L_{BP}$ and convert the linearly polarized light $L_{BP}$ to the green linearly polarized light $L_{GP}$ and the red linearly polarized light $L_{RP}$.

The long axis direction $D_L$ of the quantum rods 17R and 17G can be confirmed using a transmission electron microscope.

A method for orienting the long axes of the quantum rods 17G and 17R in a direction parallel to the polarization direction of the linearly polarized light $L_{BP}$ emitted from the reflective polarizing plate 14 is not particularly limited. For example, the material constituting the quantum rods 17G and 17R is dispersed in a thermoplastic film, and then the thermoplastic film is stretched, whereby the long axes of the quantum rods 17G and 17R can be oriented in the stretching direction. The thermoplastic film is not particularly limited, and a well-known thermoplastic film can be used. Examples thereof are described in Paragraph "0014" of JP2001-174636A, Paragraph "0014" of JP2001-174809A, and the like, the contents of which are incorporated into the present invention.

According to the liquid crystal display device 10, even when only a small amount of a fluorescent material constituting the quantum rods 17G and 17R is included in the quantum rod sheet 16, the front surface brightness can be sufficiently improved. The preferred range of the content of the fluorescent material in the quantum rod sheet 16 depends on the kind of the fluorescent material, but the content of the fluorescent material is preferably set in the following range since the amount of the fluorescent material being used is decreased, and the manufacturing costs are reduced. Meanwhile, when the content is too small, the light emission intensity becomes uneven in the plane of an optical conversion member, which is not preferable.

In a case in which the quantum rods 17G and 17R are constituted of a fluorescent material, the mass of the quantum rods 17R and 17G per unit area of the quantum rod sheet 16 is preferably 0.000001 to 2 $g/m^2$, more preferably 0.000005 to 0.02 $g/m^2$, and still more preferably 0.00001 to 0.01 $g/m^2$.

Meanwhile, the light intensities of green linearly polarized light $L_{GP}$ and red linearly polarized light $L_{RP}$ to be obtained can be adjusted by adjusting the respective amounts of the quantum rods 17G and 17R. Therefore, the proportions of the blue linearly polarized light $L_{BP}$, the green linearly polarized light $L_{GP}$, and the red linearly polarized light $L_{RP}$ which are emitted from the quantum rod sheet 16 can be made to be equal to each other. Therefore, it is possible to make white hue more achromatic.

In the liquid crystal display device 10 of the present embodiment, the unpolarized light $L_B$ which has been emitted from the backlight 12 is incident on the reflective polarizing plate 14. The unpolarized light is converted to blue linearly polarized light $L_{BP}$ using the reflective polarizing plate 14. The blue linearly polarized light $L_{BP}$ is incident on the quantum rod sheet 16, part of the blue linearly polarized light $L_{BP}$ passes through the quantum rod sheet, the rest of the blue linearly polarized light is optically converted to green linearly polarized light $L_{GP}$ and red linearly polarized light $L_{RP}$, and the green linearly polarized light and the red linearly polarized light are emitted. Therefore, it is possible to obtain blue linearly polarized light $L_{BP}$, green linearly polarized light $L_{GP}$, and red linearly polarized light $L_{RP}$. When the polarization direction of the linearly polarized light $L_{RP}$ and the long axes of the quantum rods 17G and 17R are parallel to each other, it is possible to increase the polarization efficiency emitted from the quantum rods 17G and 17R. Furthermore, the proportions of the blue linearly polarized light $L_{BP}$, the green linearly polarized light $L_{GP}$, and the red linearly polarized light $L_{RP}$ which are emitted from the quantum rod sheet 16 as described above can be made to be equal to each other. Therefore, it is possible to enable colors to be reproduced in an excellent manner on images displayed on the liquid crystal panel 18.

Even when the unpolarized light $L_B$ is reflected, for example, in a polarized S wave form on the reflective polarizing plate 14, the reflected light $L_r$ of the S wave is reflected on the backlight 12 and is incident on the reflective polarizing plate 14 in a polarized state. When an absorption-type polarizing plate is used, although it is possible to radiate light polarized along the long axes of the quantum rods, light polarized orthogonal to the long axes of the quantum rods 17G and 17R is absorbed, and thus the use efficiency of the light $L_B$ from the backlight 12 becomes poor. Therefore, light polarizing orthogonal to the long axes of the quantum rods 17G and 17R, that is, the polarized S wave is reflected by a reflection member (not illustrated) in the backlight 12, and this reflected light $L_r$ is reused, whereby it is possible to increase the use efficiency of the light $L_B$ from the backlight and also further increase the efficiency of the light emission polarization of the quantum rods. As described above, it is possible to increase the use efficiency of the unpolarized light $L_B$ from the backlight 12. The intensity of light which is emitted from the quantum rod sheet 16 and can be used in the liquid crystal panel 18 can be set to approximately 90 when the intensity of light from the backlight 12 is considered as 100, and the brightness can be increased.

Figure 9:
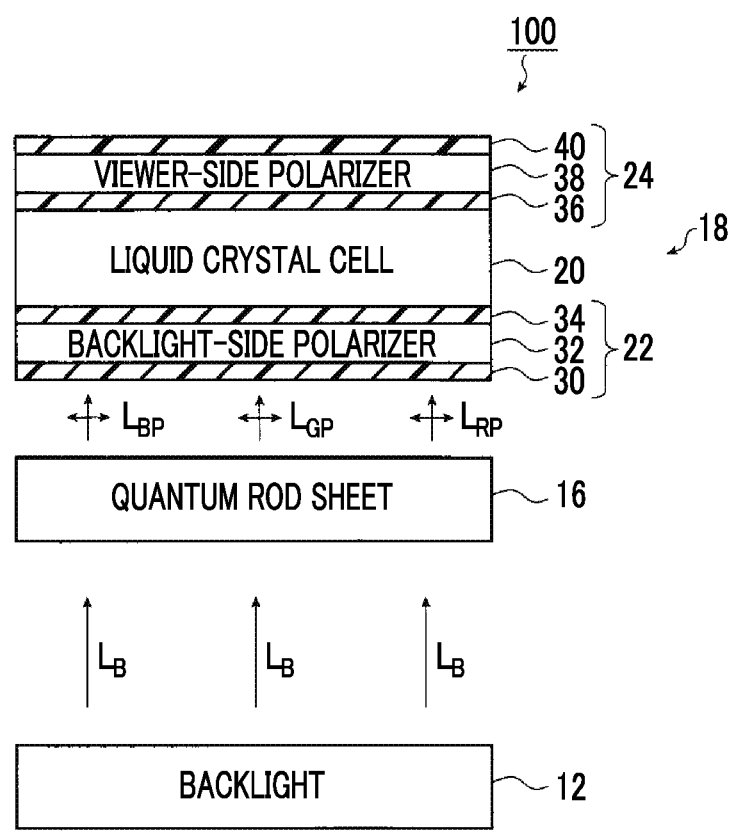
FIG. 9 is a schematic view illustrating a liquid crystal display device of the related art.

Here, FIG. 9 illustrates a liquid crystal display device 100 of the related art. This liquid crystal display device 100 of the related art has the same constitution as that of the liquid crystal display device 10 illustrated in FIG. 1 except for the fact that the reflective polarizing plate 14 is not provided, and thus the liquid crystal display device will not be described in detail.

In the liquid crystal display device 100 of the related art, the light intensity of the blue linearly polarized light $L_{BP}$ converted in the quantum rod sheet 16 is halved in the backlight-side polarizing plate 22. Therefore, when the intensity of the light from the backlight 12 is considered as 100, the intensity of light which is emitted from the quantum rod sheet 16 and can be reused in the liquid crystal panel 18 is approximately 75. This fact indicates that the liquid crystal display device 10 of the present embodiment is capable of increasing the use efficiency of the backlight 12 and increase the brightness compared with the liquid crystal display device 100 of the related art. In addition, when it is necessary to obtain the same brightness as that of the liquid crystal display device 100 of the related art, it is possible to decrease the intensity of the light from the backlight 12 and decrease the power consumption more than in the related art.

As described above, in the liquid crystal display device 10 of the present embodiment, color reproducibility becomes excellent, and it is possible to improve brightness.

Hereinafter, the reflective polarizing plate 14 will be described in detail.

Figure 2A:
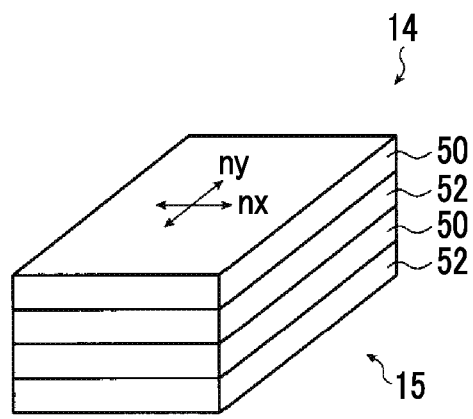
FIG. 2A is a schematic diagram illustrating a lamination-type reflective polarizing plate that is used in the liquid crystal display device of the first embodiment of the present invention.

As the reflective polarizing plate 14 which, out of unpolarized light $L_B$, transmits the P wave and reflects the S wave in order to obtain linearly polarized light $L_{BP}$, it is possible to use, for example, a resin lamination-type reflective polarizing layer in which resins having different refractive indexes are laminated together. Specifically, it is possible to use a dielectric multilayer film 15 in which reflective index anisotropic layers 50 and reflective index isotropic layers 52 are laminated together as illustrated in FIG. 2A. In the dielectric multilayer film 15, the refractive index anisotropic layers are laminated together so as to have directions in which the in-plane refractive index thereof is maximized substantially parallel to each other in all of the layers.

The in-plane refractive index of the refractive index anisotropic layer 50 is, for example, 1.8 or lower in the maximum direction nx and 1.5 or lower in the minimum direction ny, and nx and ny are substantially orthogonal to each other. In addition, the in-plane refractive index n of the refractive index isotropic layer 52 is, for example, 1.5 or lower. For example, the refractive index anisotropic layer 50 is constituted of PET, and the refractive index isotropic layer 52 is constituted of PEN. Meanwhile, the number of the refractive index anisotropic layers or the refractive index isotropic layers laminated in FIG. 2A is two, but the number of the layers laminated is, for example, 50 or more in total. The film thickness of the dielectric multilayer film 15 is preferably thin. The total film thickness is preferably 5 to 100 µm, more preferably 5 to 50 µm, particularly preferably 5 to 20 µm, more particularly preferably 5 to 10 µm, and still more particularly preferably 5 to 9 µm. Meanwhile, as the dielectric multilayer film, it is possible to use a well-known dielectric multilayer film, for example, DBEF (trade name).

The reflection central wavelength, that is, the wavelength at which the peak of the reflectivity is imparted can be adjusted by changing the thicknesses or refractive indexes of the respective layers constituting the dielectric multilayer film. Specifically, the reflection central wavelength is described in detail in a dissertation "Design Optimization of Reflective Polarizers for LCD Backlight Recycling" in Journal of Display Technology, Vol. 5, No. 8, (2009).

A method for manufacturing the dielectric multilayer film is not particularly limited, and the dielectric multilayer film can be manufactured with reference to, for example, Row 15 in the left column on Page 9 to Row 6 in the left column on Page 10 of JP1991-41401A (JP-H03-41401A), Paragraphs "0035" to "0039" of JP1992-268505A (JP-H04-268505A), Paragraphs "0035" to "0039" of JP2004-171025A, Rows 16 to 21 on Page 31 of JP1997-506985A (JP-H09-506985A), Paragraphs "0108" to "0111" of JP2004-046216A, Paragraphs "0108" to "0111" of JP2010-009051A, Row 1 on Page 34 to Row 1 on Page 35 of JP1997-506984A (JP-H09-506984A), and the like, the contents of which are incorporated into the present invention. Meanwhile, the dielectric multilayer film is also referred to as a dielectric multilayer reflective polarizing plate or a birefringence interference polarizer of an alternate multilayer film.

Figure 2B:
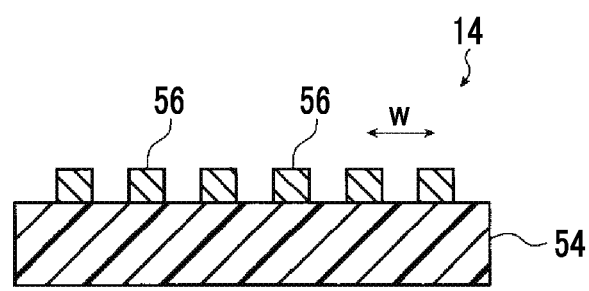
FIG. 2B is a schematic diagram illustrating a wire grid-type reflective polarizing plate that is used in the liquid crystal display device of the first embodiment of the present invention.

The reflective polarizing plate 14 may be a polarizing plate that is called a wire grid-type polarizer illustrated in FIG. 2B. In the wire grid-type polarizer, fine metal lines 56 are disposed parallel to each other at the same intervals on a substrate 54 that is transparent to unpolarized blue light $L_B$. For example, the substrate 54 can be constituted of glass, a TAC film, or the like, and the fine metal line 56 can be constituted of aluminum.

The wire grid-type polarizer is disposed so that the wire direction w, that is, the direction in which the fine metal lines 56 are arranged becomes orthogonal to the transmission axis direction $D_T$ of the backlight-side polarizing plate 22 (refer to FIG. 1). The polarization direction of linearly polarized light $L_{BP}$ and the transmission axis direction $D_T$ of the backlight-side polarizing plate 22 (refer to FIG. 1) can be made to coincide with each other by disposing the reflective polarizing plate 14 on the basis of the wire direction w.

Another aspect of the reflective polarizing plate 14 will be described. The reflective polarizing plate 14 may have, in addition to the above-described constitution, for example, an interface having a varying refractive index, and the shape of this interface includes an uneven shape formed of protrusion portions and recess portions. Specifically, the interface having a varying refractive index is constituted to be inclined with respect to the emission direction of blue light $L_B$ from the backlight 12 as illustrated in the cross-sectional constitution of FIG. 3A.

Figure 3A:
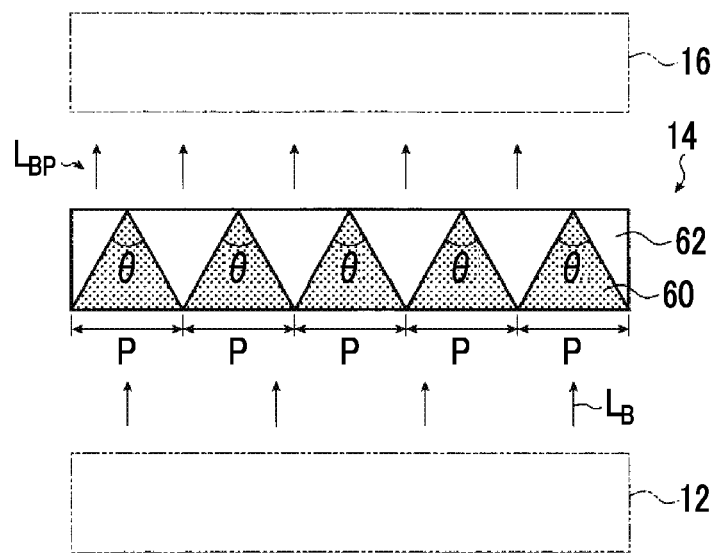
FIG. 3A is a schematic cross-sectional view illustrating an example of the reflective polarizing plate in the liquid crystal display device of the first embodiment of the present invention.

In the reflective polarizing plate 14 illustrated in FIG. 3A, high-refractive index layers 60 having a triangular cross-section and low-refractive index layers 62 having a refractive index lower than that of the high-refractive index layer 60 are provided, and the high-refractive index layers 60 and the low-refractive index layers 62 are directly laminated together. The high-refractive index layer 60 and the low-refractive index layer 62 being directly laminated together means that the two layers are in direct contact with each other without having an interlayer such as an easy adhesive layer or a pressure sensitive adhesive layer therebetween. When the two layers are in direct contact with each other as described above, it is considered that a strong light collection effect can be obtained in the interface between the two layers.

In the reflective polarizing plate 14 illustrated in FIG. 3A, the interfaces between the high-refractive index layers 60 and the low-refractive index layers 62 correspond to triangular inclined surfaces and are inclined with respect to light $L_B$. For example, the refractive index of the high-refractive index layer 60 is refractive-index-anisotrpic and is approximately 1.6 to 2.0 in the high-refractive-index direction and approximately 1.5 to 1.8 in the low-refractive-index direction. The low-refractive index layer 62 has a constant refractive index, and the average refractive index is 1.00 or higher and lower than 1.80.

Here, it is preferable that the refractive index of the high-refractive index layer 60 in the high-refractive-index direction is extremely higher than the refractive index of the low-refractive index layer 62 and the refractive index of the high-refractive index layer 60 in the low-refractive-index direction is substantially the same as the refractive index of the low-refractive index layer 62.

In the reflective polarizing plate 14 illustrated in FIG. 3A, the difference in the reflectivity between the P wave and the S wave is used, and, out of unpolarized light $L_B$, the P wave is transmitted and the S wave is reflected in the interfaces between the high-refractive index layers 60 and the low-refractive index layers 62, thereby separating the P wave and the S wave.

The composition of the high-refractive index layer 60 is not particularly limited as long as the high-refractive index layer is refractive-index-anisotropic, for example, approximately 2.0 in the high-refractive-index direction and approximately 1.5 in the low-refractive-index direction.

The low-refractive index layer 62 is constituted of, for example, a thermoplastic resin. Examples of the thermoplastic resin include polymethyl methacrylate (PMMA) resins, polycarbonate resins, polystyrene resins, polymethacrylic styrene (MS) resins, acrylonitrile styrene (AS) resins, polypropylene resins, polyethylene resins, polyethylene terephthalate resins, polyvinyl chloride (PVC) resins, cellulose acylate, cellulose triacetate, cellulose acetate propionate, cellulose diacetate, thermoplastic elastomers, copolymers thereof, cycloolefin polymers, and the like.

In addition, the resin layer is preferably a cured layer formed by carrying out a curing treatment on a curable composition from the viewpoint of ease of forming the layer. The curable composition may be a photocurable composition which is cured by means of light irradiation or a thermosetting composition which is cured by means of heating. From the viewpoint of improving productivity, a photocurable composition is preferred since it is possible to finish the curing treatment within a short period of time. Examples of the curable composition include curable compositions including a (meth)acrylate as a curable compound. Here, the (meth)acrylate refers to both an acrylate and a methacrylate. Specific examples thereof include compositions including a curable compound such as phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenyl-phenoxyethyl (meth)acrylate, 4-phenylphenoxyethyl (meth)acrylate, 3-(2-phenylphenyl)-2-hydroxypropyl (meth)acrylate, a (meth)acrylate of p-cumylphenol with which an ethylene oxide is reacted, an ethylene oxide-added bisphenol A (meth)acrylic acid ester, a propylene oxide-added bisphenol A (meth)acrylic acid ester, a bisphenol A epoxy (meth)acrylate obtained by an epoxy ring-opening reaction between a bisphenol A diglycidyl ether and a (meth)acrylic acid, or a bisphenol F epoxy (meth)acrylate obtained by an epoxy ring-opening reaction between a bisphenol F diglycidyl ether and a (meth)acrylic acid.

In addition, the high-refractive index layers may be in direct contact with the atmosphere without providing the low-refractive index layers 62. In this case, the refractive index of the atmosphere is approximately 1 and is lower than that of the high-refractive index layer 60.

Figure 3B:
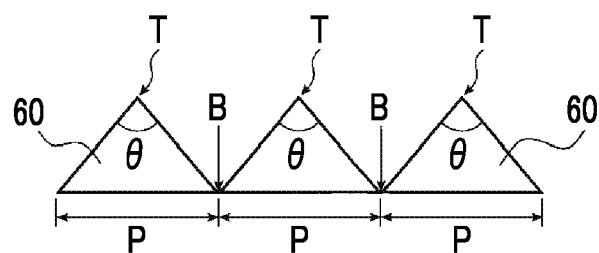
FIG. 3B is a schematic view illustrating the disposition of a high-refractive-index layer.

As illustrated in FIG. 3B, in the case of the triangular cross-section, the inner angle at the top point of a protrusion portion which is indicated by the reference sign T of a triangle formed by connecting the top point of the protrusion portion T and bottom portions B of two recess portions is set to θ. This inner angle θ depends on the refractive index of the high-refractive index layer 60 and is preferably 40° to 100°. The distance P between the bottom portions of the recess portions which are adjacent to each other through a protrusion portion indicated by the reference sign B is preferably 1 to 200 µm. It is more preferable that the distance P is 5 to 100 µm and the inner angle θ is 60° to 90°.

Figure 3C:
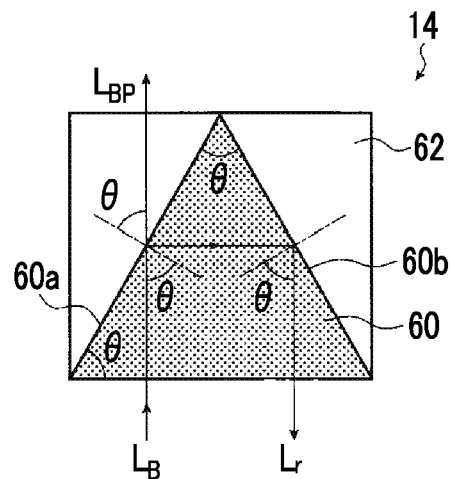
FIG. 3C is a schematic view illustrating transmission and reflection of unpolarized light.

As illustrated in FIG. 3C, when light $L_B$ is incident on the high-refractive index layer 60 in the reflective polarizing plate 14, the P wave passes through an inclined surface 60a, and the S wave is reflected on the inclined surface 60a, reaches an inclined surface 60b from which reflected light $L_r$ comes toward the S wave, is reflected on the inclined surface 60b, and is reflected toward the backlight 12. This S wave turns into reflected light $L_r$. In the reflective polarizing plate 14 illustrated in FIG. 3A, the reflected light $L_r$ can be effectively used, which is preferable.

Figure 4A:
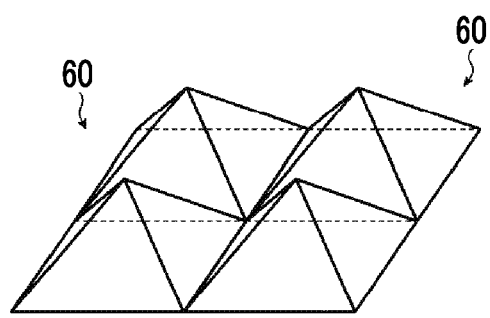
FIG. 4A is a schematic perspective view illustrating an example of the form of the high-refractive-index layer in the reflective polarizing plate illustrated in FIG. 3A.
Figure 4B:
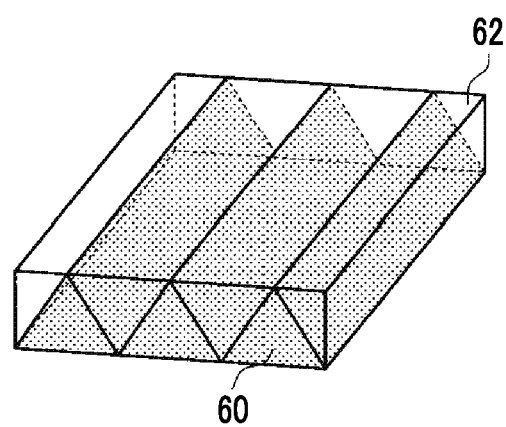
FIG. 4B is a schematic perspective view illustrating another example of the form of the high-refractive-index layer in the reflective polarizing plate illustrated in FIG. 3A.

Meanwhile, examples of the cross-sectional shape illustrated in FIG. 3A include a cross-sectional shape of the high-refractive index layers 60 having a triangular pyramid shape which are connected to each other, which is illustrated in FIG. 4A, and a cross-sectional shape of the high-refractive index layers 60 having a triangular prism shape which are disposed so as to have the bottom surfaces arranged on the same surface, which is illustrated in FIG. 4B. In any cases, the P wave and the S wave can be separated from each other as illustrated in FIG. 3C, and the P wave is linearly polarized light $L_{BP}$, and the S wave is reflected light $L_r$.

Figure 5A:
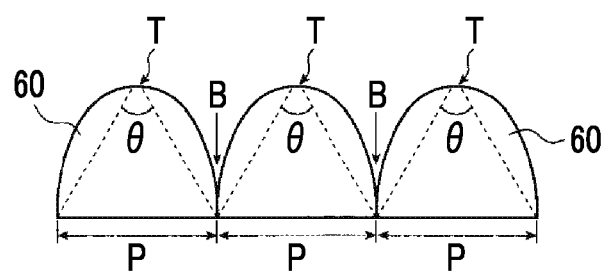
FIG. 5A is a schematic perspective view illustrating an example of the reflective polarizing plate.

In addition, in the reflective polarizing plate 14 including the high-refractive index layers 60 and the low-refractive index layers 62, the cross-sectional shape is not limited to a triangular shape. For example, as illustrated in FIG. 5A, the high-refractive index layer 60 may have a hemispherical elliptical cross-sectional shape. Meanwhile, in FIG. 5A, the low-refractive index layer 62 is not illustrated.

In this case, the distance P refers to the distance between the bottom portions of recess portions indicated by the reference sign B in FIG. 5A. In addition, the inner angle θ refers to the inner angle at the top point of a protrusion portion which is indicated by the reference sign T in FIG. 5A of a triangle formed by connecting the top point of the protrusion portion T and the bottom portions B of two recess portions.

Figure 5B:
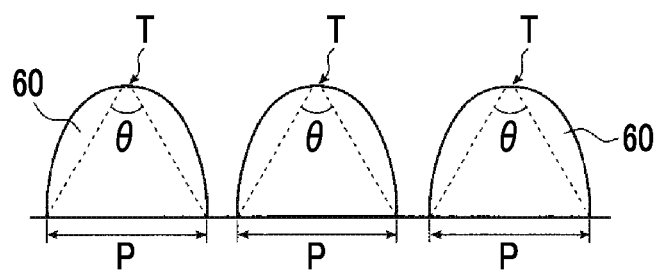
FIG. 5B is a schematic perspective view illustrating another example of the reflective polarizing plate.

In addition, as illustrated in FIG. 5B, the high-refractive index layers 60 having a hemispherical elliptical shape may be separated from each other. In this case, the distance P refers to the distance between two points at which the bottom surface of a recess portion and the bottom surface of a protrusion portion cross each other. The inner angle θ refers to the inner angle at the top point of a protrusion portion of a triangle formed by connecting two points and the top point of the protrusion portion T.

Figure 6A:
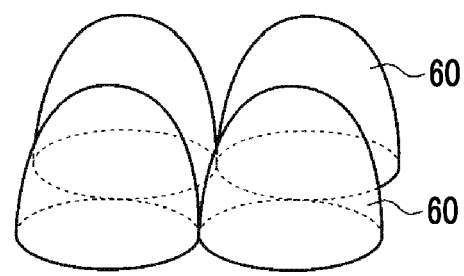
FIG. 6A is a schematic perspective view illustrating an example of another form of the high-refractive-index layer in the reflective polarizing plate illustrated in FIG. 5A.
Figure 6B:
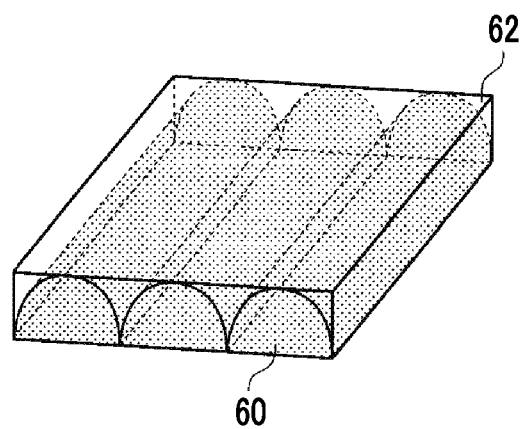
FIG. 6B is a schematic perspective view illustrating another example of the above-described form of the high-refractive-index layer in the reflective polarizing plate illustrated in FIG. 5A.

Examples of the cross-sectional shape illustrated in FIG. 5A include a cross-sectional shape of the high-refractive index layers 60 having a hemispherical ellipse shape which are connected to each other, which is illustrated in FIG. 6A, and a cross-sectional shape of the high-refractive index layers 60 having a triangular prism cross-sectional shape which are disposed so as to have the bottom surfaces arranged on the same surface, which is illustrated in FIG. 4B. In any cases, as in FIG. 3C, the P wave and the S wave can be separated from each other, and it is possible to consider the P wave as linearly polarized light $L_{BP}$ and the S wave as reflected light $L_r$.

In addition, for example, the high-refractive index layers 60 having a polygonal prism shape, a conical shape, a partially spherical ellipse shape, or a partially spherical shape may be disposed in a two-dimensional manner, or the high-refractive index layers 60 having a partially columnar shape, a partially elliptical column shape, or a prismatic column shape may be disposed in a one-dimensional manner.

Figure 7:
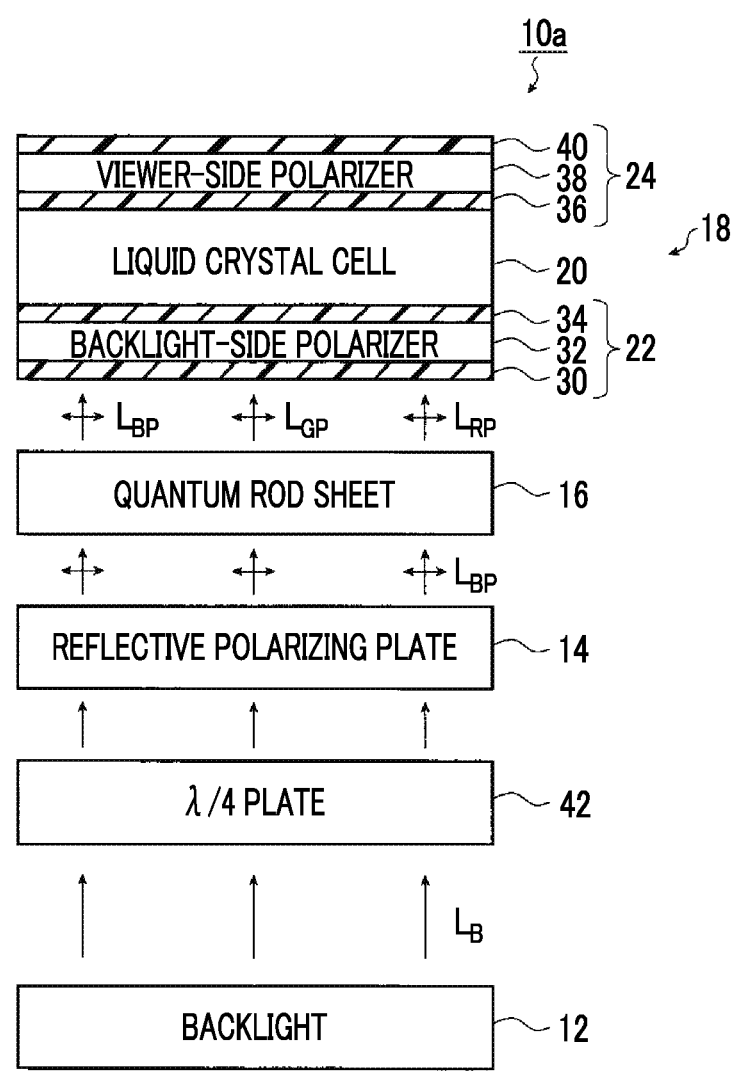
FIG. 7 is a schematic view illustrating a modification example of the liquid crystal display device of the first embodiment of the present invention.

In the present embodiment, a λ/4 plate 42 may be provided between the backlight 12 and the reflective polarizing plate 14 as in a liquid crystal display device 10a illustrated in FIG. 7. Meanwhile, in the liquid crystal display device 10a illustrated in FIG. 7, the same constituent elements as in the liquid crystal display device 10 illustrated in FIG. 1 will be given the same reference sign and will not be described in detail.

When the λ/4 plate 42 is provided, it is possible to further increase the use efficiency of the unpolarized light $L_B$ from the backlight 12. Therefore, it is possible to improve the brightness while maintaining the hue and, furthermore, decrease the power consumption.

In a case in which the reflective polarizing plate 14 is the dielectric multilayer film illustrated in FIG. 2A, the λ/4 plate 42 is disposed so that the slow axis of the λ/4 plate 42 and the directions in which the in-plane refractive indexes of the refractive index anisotropic layers in the reflective polarizing plate 14 are maximized form approximately 45 degrees. In addition, in a case in which the reflective polarizing plate 14 is a wire grid-type polarizer, the λ/4 plate 42 is disposed so that the slow axis of the λ/4 plate 42 and the wire direction in the reflective polarizing plate 14 form approximately 45 degrees.

In a case in which the reflective polarizing plate 14 is constituted of the high-refractive index layers 60 and the low-refractive index layers 62 as illustrated in FIG. 3A, the λ/4 plate 42 is disposed so that the slow axis of the λ/4 plate 42 and the slow-axis direction of the reflective polarizing plate 14 form approximately 45 degrees. When the λ/4 plate 42 is disposed as described above, it is possible to increase the use efficiency of light in the reflective polarizing plate 14, which is preferable. Meanwhile, the "slow axis" refers to a direction in which the refractive index is maximized.

Figure 8:
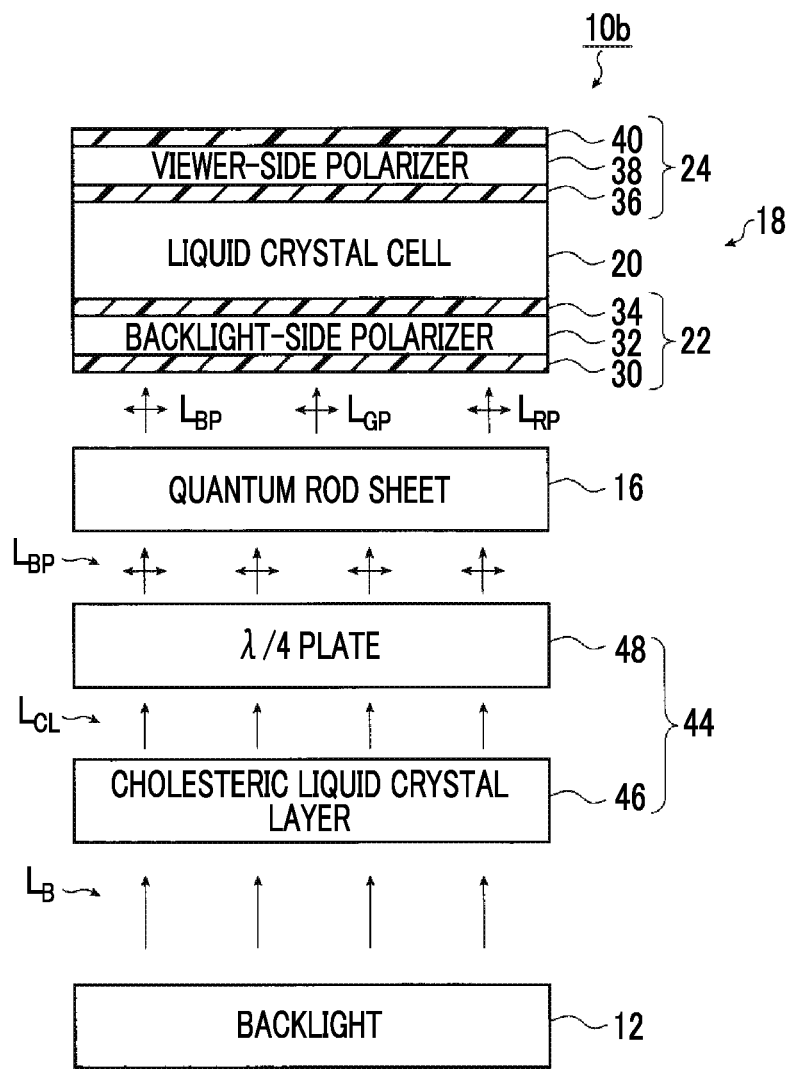
FIG. 8 is a schematic view illustrating a liquid crystal display device of a second embodiment of the present invention.

Next, a liquid crystal display device of a second embodiment of the present invention will be described. FIG. 8 is a schematic view illustrating the liquid crystal display device of the second embodiment of the present invention.

In the present embodiment, the same constituent elements as in the liquid crystal display device 10 of the first embodiment illustrated in FIG. 1 will be given the same reference sign and will not be described in detail.

A liquid crystal display device 10b of the present embodiment has the same constitution as that of the liquid crystal display device 10 of the first embodiment except for the fact that the constitution of a reflective polarizing plate 44 is different from that of the liquid crystal display device 10 (refer to FIG. 1) of the first embodiment, and thus the liquid crystal display device will not be described in detail.

The reflective polarizing plate 44 in the liquid crystal display device 10b of the present embodiment is constituted of a cholesteric liquid crystal layer 46 and a λ/4 plate 48. The cholesteric liquid crystal layer 46 and the λ/4 plate 48 are sequentially disposed from the backlight 12 side. The reflective polarizing plate 44 does not separate light to the P wave and the S wave, and, as described below, unpolarized light $L_B$ is converted to circularly polarized light $L_{CL}$ using the cholesteric liquid crystal layer 46, and the circularly polarized light $L_{CL}$ is converted to linearly polarized light $L_{BP}$ using the λ/4 plate 48.

The cholesteric liquid crystal layer 46 converts unpolarized light $L_B$ to right- or left-circularly polarized light $L_{CL}$.

In the cholesteric liquid crystal layer 46, the reflection central wavelength, that is, the wavelength at which the peak of the reflectivity is imparted can be adjusted by changing the helix pitches or refractive indexes of a light reflection layer formed by fixing a cholesteric liquid crystal phase, and the pitches can be easily adjusted by changing the amount of a chiral agent being added. Specifically, the reflection central wavelength is described in detail in Fujifilm Research & Development No. 50 (2005), pp. 60 to 63.

For example, the light reflection layer formed by fixing a cholesteric liquid crystal phase using a clockwise-rotating chiral agent or a counterclockwise-rotating chiral agent is applied and, as necessary, dried and cured, whereby the cholesteric liquid crystal layer 46 can be produced.

The above-described chiral agent can be selected from a variety of well-known chiral agents (described in, for example, Section 4-3 Chiral agents for TN and STN, Chapter 3, Liquid Crystal Display Handbook, p. 199, $42^{nd}$ Committee of Japan Society for the Promotion of Science, 1989). Chiral agents generally have an asymmetric carbon atom, but an axial asymmetric compound or planar asymmetric compound having no asymmetric carbon atom can also be used as the chiral agent. Examples of the axial asymmetric compound or planar asymmetric compound include binaphthyl, helicene, paracyclophane, and derivatives thereof. The chiral agent may have a polymerizable group. In a case in which the chiral agent has a polymerizable group, and a rod-shaped liquid crystal compound that is jointly used with the chiral agent also has a polymerizable group, it is possible to form a polymer having a repeating unit derived from the rod-shaped liquid crystal compound and a repeating unit derived from the chiral agent by means of a polymerization reaction between the chiral agent having a polymerizable group and the polymerizable rod-shaped liquid crystal compound. In this aspect, the polymerizable group in the chiral agent having a polymerizable group and the polymerizable group in the polymerizable rod-shaped liquid crystal compound are preferably the same kind of groups. Therefore, the polymerizable group in the chiral agent is also preferably an unsaturated polymerizable group, an epoxy group, or an aziridinyl group, more preferably an unsaturated polymerizable group, and particularly preferably an ethylenic unsaturated polymerizable group. In addition, the above-described chiral agent may be a liquid crystal compound.

Examples of a chiral agent exhibiting a strength twisting force include chiral agents described in Paragraphs "0028" to "0067" of JP2010-181852A, Paragraphs "0048" to "0056" of JP2003-287623A, Paragraphs "0019" to "0041" of JP2002-80851A, Paragraphs "0023" to "0043" of JP2002-80478A, and Paragraphs "0015" to "0055" of JP2002-302487A, and these chiral agents can be preferably used in the present invention. Furthermore, for the isosorbide compounds described in these laid-open publications, it is also possible to use isomannide compounds having the corresponding structure, and, for the isomannide compounds described in these laid-open publications, it is also possible to use isosorbide compounds having the corresponding structure.

A method for manufacturing the light reflection layer formed by fixing a cholesteric liquid crystal phase is not particularly limited, and it is possible to use, for example, methods described in Row 10 in the upper-right column on Page 2 to Row 3 in the left-upper column on Page 4 of JP1989-133003A (JP-H01-133003A), Paragraphs "0016" to "0044" of JP1996-146416A (JP-H08-146416A), Paragraphs "0047" to "0065" of JP1994-324333A (JP-H06-324333A), Paragraphs "0010" to "0029" of JP1996-271731A (JP-H08-

271731A), Paragraphs "0010" to "0105" of JP2002-80851A, and Paragraphs "0024" to "0045" of JP2002-80478A, the contents of which are incorporated into the present invention. Hereinafter, the method described in JP1996-271731A (JP-H08-271731A) will be described.

As the cholesteric liquid crystal, an appropriate cholesteric liquid crystal may be used, and there is no particular limitation. A liquid crystal polymer is advantageously used from the viewpoint of the superimposition efficiency, thickness reduction, and the like of the liquid crystal layer. In addition, cholesteric liquid crystal molecules having large birefringence are preferred since the wavelength range of selective reflection becomes broad.

As the above-described liquid crystal polymer, it is possible to use, for example, an appropriate liquid crystal polymer such as a main chain-type liquid crystal polymer such as polyester, a side chain-type liquid crystal polymer made of an acrylic main chain, a methacrylic main chain, a siloxane main chain, or the like, a low-molecular-weight chiral agent-containing nematic liquid crystal polymer, a chiral component-introduced liquid crystal polymer, or a mixed liquid crystal polymer of a nematic-based polymer and a cholesteric-based polymer. Liquid crystal polymers having a glass transition temperature in a range of 30° C. to 150° C. are preferred from the viewpoint of the handling property and the like.

The light reflection layer formed by fixing a cholesteric liquid crystal phase can be formed using an appropriate method such as a method in which a cholesteric liquid crystal is directly applied to a support through an appropriate orientation film such as an obliquely-evaporated layer of polyimide, polyvinyl alcohol, or SiO as necessary or a method in which a cholesteric liquid crystal is applied to a support the quality of which does not change at the orientation temperature of a liquid crystal polymer made of a transparent film or the like through an orientation film as necessary. The phase difference of the support being used is preferably as small as possible since the state change of polarized light is prevented. In addition, it is also possible to employ a superimposition method or the like of light reflection layers formed by fixing a cholesteric liquid crystal phase through an orientation film.

Meanwhile, the liquid crystal polymer can be applied using a method in which a liquid-form substance such as a solution obtained using a solvent or a molten liquid obtained by means of heating is developed using an appropriate method such as a roll coating method, a gravure printing method, or a spin coating method. The thickness of the cholesteric liquid crystal layer 46 is preferably 0.5 to 100 μm from the viewpoint of a selective reflection property, prevention of orientation disarray or a decrease in the transmittance.

Hereinafter, a liquid crystal composition which can be preferably used as the cholesteric liquid crystal layer and is described in JP2002-80851A will be described.

The liquid crystal composition is a light reflection layer in which, particularly, a photoreactive chiral agent represented by General Formula (I) is used as the chiral agent that changes the helix structure of the liquid crystal molecule. Therefore, the twisting force (twist angle) of the liquid crystal can be significantly changed.

General Formula (I)

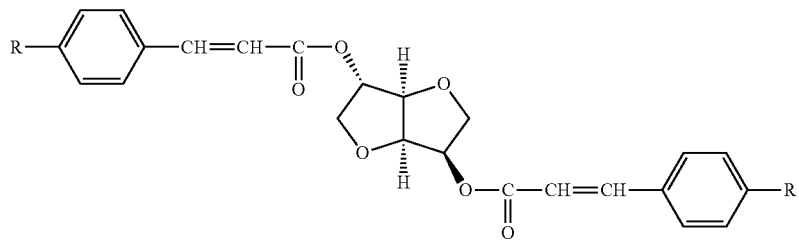

The photoreactive chiral agent is made of a compound represented by General Formula (I) and is capable of controlling the orientation structure of liquid crystalline compounds and changing the helix pitch of liquid crystals, that is, the twisting force of the helix structure (helical twisting power (HTP)) by means of irradiation of light. That is, the photoreactive chiral agent is a compound that changes the twisting force of helix structures derived from liquid crystalline compounds, preferably, nematic liquid crystal compounds by means of irradiation of light (ultraviolet rays~visible light rays~infrared rays) and has a chiral portion and a portion at which a structural change is caused by means of irradiation of light as necessary portions (molecular structure unit). Furthermore, the photoreactive chiral agent represented by General Formula (I) is capable of significantly changing the HTP of, particularly, liquid crystal molecules. Therefore, in the case of cholesteric liquid crystals (liquid crystal phases) for which a nematic liquid crystal compound is used as the liquid crystalline compound, selective reflection becomes possible in a broad wavelength range including three primary colors of blue (B), green (G), and red (R). That is, since the selective reflection characteristics of the wavelengths of light are determined by the twist angle of the helix structure of liquid crystal molecules, the width of color that is selectively reflected becomes broad as the angle changes significantly, which is useful.

Meanwhile, the HTP represents the twisting force of the helix structure of liquid crystals, that is, HTP=1/(the pitch× the concentration [mass fraction] of the chiral agent) and can be obtained by, for example, measuring the helix pitch (one cycle of the helix structure; μm) of a liquid crystal molecule at a certain temperature and converting [μm$^{-1}$] this value from the concentration of the chiral agent. In a case in which selective reflection color is formed using the photoreactive chiral agent by means of irradiation with light, the change ratio of the HTP (=the HTP before irradiation/the HTP after irradiation) is preferably 1.5 or higher and, furthermore, more preferably 2.5 or higher in a case in which the HTP becomes lower after irradiation and preferably 0.7 or lower and, furthermore, more preferably 0.4 or lower in a case in which the HTP becomes higher after irradiation.

Next, the compound represented by General Formula (I) will be described.

In General Formula (I), R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total. Examples of the above-described alkoxy group having 1 to 15 carbon atoms include a methoxy group, an ethoxy group, a propoxy group, a butoxy group, a hexyloxy group, a dodecyloxy group, and the like, and, among these, an alkoxy group having 1 to 12 carbon atoms is preferred, and an alkoxy group having 1 to 8 carbon atoms is particularly preferred.

Examples of the above-described acryloyloxyalkyloxy group having 3 to 15 carbon atoms in total include an acryloyloxyethyloxy group, an acryloyloxybutyloxy group, an acryloyloxydecyloxy group, and the like, and, among these, an acryloyloxyalkyloxy group having 5 to 13 carbon atoms is preferred, and an acryloyloxyalkyloxy group having 5 to 11 carbon atoms is particularly preferred.

Examples of the above-described methacryloyloxyalkyloxy group having 4 to 15 carbon atoms in total include a methacryloyloxyethyloxy group, a methacryloyloxybutyloxy group, a methacryloyloxydecyloxy group, and the like, and, among these, a methacryloyloxyalkyloxy group having 6 to 14 carbon atoms is preferred, and a methacryloyloxyalkyloxy group having 6 to 12 carbon atoms is particularly preferred.

The molecular weight of the above-described photoreactive chiral agent represented by General Formula (I) is preferably 300 or higher. In addition, a photoreactive chiral agent having a high solubility with a liquid crystalline compound described below is preferred, and a photoreactive chiral agent having a solubility parameter (SP) value approximating to that of the liquid crystalline compounds is more preferred.

The liquid crystal composition preferably at least includes at least one kind of photoreactive chiral agent and further includes at least one kind of liquid crystalline compound (preferably a nematic liquid crystal compound), and the above-described liquid crystalline compound may or may not have a polymerizable group. In addition, the liquid crystal composition may include other components such as a polymerizable monomer, a polymerization initiator, a binder resin, a solvent, a surfactant, a polymerization inhibitor, a viscosity improver, a coloring agent, a pigment, an ultraviolet absorber, and a gelating agent as necessary. In the liquid crystal composition, it is preferable to jointly use, particularly, a surfactant. For example, in a case in which a layer is formed by applying a coating liquid-form liquid crystal composition or the like, it is possible to sterically control the orientation state in an air interface of the layer surface and obtain selective reflection wavelengths having a higher color purity.

The content of the photoreactive chiral agent in the liquid crystal composition is not particularly limited, can be appropriately selected, and is preferably approximately 2% to 30% by mass.

The liquid crystalline compound can be appropriately selected from liquid crystal compounds, high-molecular-weight liquid crystal compounds, and polymerizable liquid crystal compounds which have a refractive index anisotropy Δn in a range of 0.10 to 0.40. Examples thereof include smectic liquid crystal compounds, nematic liquid crystal compounds, and the like, and, among these, a nematic liquid crystal compound is preferred. For example, when a nematic liquid crystal compound is used as the liquid crystalline compound, and the above-described photoreactive chiral agent represented by General Formula (I) is jointly used with the nematic liquid crystal compound, it is possible to produce a cholesteric liquid crystal composition (cholesteric liquid crystal phase). The above-described liquid crystalline compound can be oriented using, for example, an orientation substrate which has been subjected to a rubbing treatment while being in a liquid crystal state during melting. In addition, in order to fix the liquid crystalline compound by turning the liquid crystal state into a solid phase, it is possible to use means such as cooling or polymerization.

From the viewpoint of ensuring a sufficient curing property and making the layer heat-resistant, a liquid crystalline compound having a polymerizable group or a crosslinking group in the molecule is preferred.

The content of the above-described liquid crystalline compound is preferably 30% to 99.9% by mass and more preferably 50% to 95% by mass of the total solid content (mass) of the liquid crystal composition. When the above-described content is less than 30% by mass, there are cases in which orientation becomes insufficient, and, particularly, in the case of cholesteric liquid crystals, there are cases in which desired selective reflection color cannot be obtained.

As described above, the liquid crystal composition does not include the photoreactive chiral agent, and, in a method for changing the twisted structure of liquid crystals, regions in which the twisted structures of liquid crystals are different are formed by irradiating the above-described liquid crystal composition with light at different light intensities so as to change the twisting force of liquid crystals. That is, when the liquid crystal composition is irradiated with light at a desired light intensity in a desired pattern, it is possible to change the twisted structure of liquid crystals, that is, the degree of the twisting of the helix (helical twisting power; HTP) and arbitrarily change selective reflection color displayed by liquid crystals in accordance with the helical twisting power.

In addition, particularly, in a case in which a cholesteric liquid crystal phase is used as the liquid crystal phase, it is possible to arbitrarily change selective reflection color displayed by liquid crystals in accordance with the helical twisting power. In a case in which the change ratio of the helical twisting power is great, the color width of selective reflection color which liquid crystals are capable of selective reflecting becomes broad, and selective reflection in a broad wavelength range including three primary colors (B, G, and R) can be obtained, which are important from the viewpoint of a capability of displaying, particularly, three primary colors (B, G, and R) in a high color purity. Regarding this viewpoint, since, particularly, the above-described photoreflective chiral agent represented by General Formula (I) is capable of significantly changing the helical twisting power of the helix structure of liquid crystals, the use of the liquid crystal composition including this chiral agent enables hue in a broad range including three primary colors of blue (B), green (G), and red (R) to be displayed in a favorable color purity, and furthermore, three primary colors having an excellent color purity can be obtained.

Specifically, what has been described above can be achieved in the following manner. That is, when the liquid crystal composition is irradiated with light having a certain wavelength, the photoreactive chiral agent coexisting with the liquid crystal composition changes the helix structure (the twist angle) of liquid crystals in accordance with the irradiation intensity, and, due to this structural change, different selective reflection colors are displayed, and image-like patterns are formed (patterning). In the case of the cholesteric liquid crystal composition, different selective reflection colors are displayed due to this structural change. Therefore, when individual desired regions are irradiated with light at different irradiation intensities, the regions are oriented in accordance with the irradiation intensities (display multiple colors), and, for example, when the liquid crystal composition is exposed through a mask for exposure which has been produced with different light transmittances so as to have an image-like shape, it is possible to form an image, that is, colored regions selectively reflecting colors at the same time by means of a single process of light irradiation.

Furthermore, since the orientation structure depends on the compound represented by General Formula (I), it is possible to significantly change the helix pitch of liquid crystals, and, in the case of the cholesteric liquid crystal composition, colored regions to be formed display a broad range of selective reflection color, and three primary colors (B, G, and R) having an excellent color purity can be formed. In addition to the method in which a mask for exposure is used, this irradiation with light can be carried out without any particular limitation using any method as long as individual desired regions can be irradiated with light at different irradiation intensities. In a case in which liquid crystal color filters, optical films, and the like are formed, the liquid crystal composition is exposed to light having a certain wavelength in an image-like pattern in the above-described manner so as to carry out patterning and then further irradiated with light so as to photopolymerize and cure the polymerizable group in the liquid crystal composition, and the helix structure of liquid crystals is fixed to desired selective reflection colors.

Circular polarization separation films, stereoscopic vision eyeglasses, polarization masks, and the like, which are optical films, can be formed using that fact that the change ratio of the helix pitch derived from the liquid crystal phase is increased by means of light irradiation due to the above-described photoreactive chiral agent represented by General Formula (I). In addition, the above-described fact can also be applied to broad-bandwidth switchable mirrors, optical writing-type recording media, and the like. Patterning in a polarized state and patterning of helix pitches become possible when the liquid crystal composition is doped into ferroelectric liquid crystals, antiferroelectric liquid crystals, or TGB phases. In addition, it is needless to say that the liquid crystal composition can also be used as ordinary optically active compounds and can also be applied to helix structure inducers in STN elements or TN elements. In addition, it is also possible to blend a non-chiral azo-based or styrene-based compound which is isomerized using light into the liquid crystal composition, and there are cases in which the change ratio of the helix pitch during light irradiation can be further increased.

A light source that is used for light irradiation is preferably a light source emitting ultraviolet rays since the energy is high and the structural change and polymerization reaction of the liquid crystal compound can be carried out rapidly, and examples thereof include high-pressure mercury lamps, metal halide lamps, Hg—Xe lamps, and the like. In addition, the light source preferably has a light intensity-changing function.

As described above, when the liquid crystal composition including the chiral agent represented by General Formula (I) is used, it is possible to significantly change the helical twisting power of the helix structure of liquid crystals with respect to light intensities. Therefore, in the case of the cholesteric liquid crystal phase in which a nematic liquid crystal compound is used as the liquid crystalline compound, the color width of selective reflection colors which liquid crystals are capable of displaying is broad, and three primary colors of blue (B), green (G), and red (R) having an excellent color purity can be obtained.

Hereinafter, a liquid crystal composition which can be preferably used as the cholesteric liquid crystal layer and is described in JP2002-80478A will be described.

The liquid crystal composition is a liquid crystal composition in which, particularly, a photoreactive chiral agent represented by General Formula (I) is used as the chiral agent that changes the helix structure of the liquid crystal molecule.

General Formula (I)

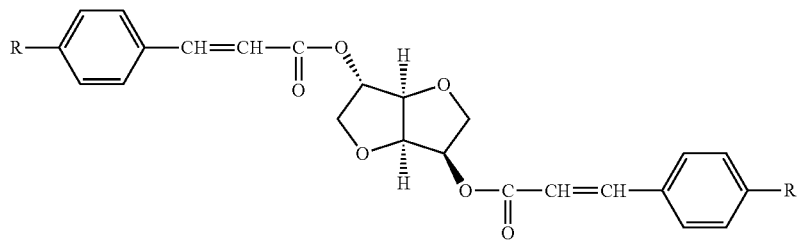

In General Formula (I), R represents a hydrogen atom, an alkoxy group having 1 to 15 carbon atoms, an acryloyloxyalkyloxy group having 3 to 15 carbon atoms in total, or a methacryloyloxyalkyloxy group having 4 to 15 carbon atoms in total. Examples of the above-described alkoxy group having 1 to 15 carbon atoms include a methoxy group, an ethoxy group, a propoxy group, a butoxy group, a hexyloxy group, an oxtyloxy group, a dodecyloxy group, and the like, and, among these, an alkoxy group having 1 to 10 carbon atoms is preferred, and an alkoxy group having 1 to 8 carbon atoms is particularly preferred.

Examples of the above-described acryloyloxyalkyloxy group having 3 to 15 carbon atoms in total include an acryloyloxy group, an acryloyloxyethyloxy group, an acryloyloxypropyloxy group, an acryloyloxyhexyloxy group, an acryloyloxybutyloxy group, an acryloyloxydecyloxy group, and the like, and, among these, an acryloyloxyalkyloxy group having 3 to 13 carbon atoms is preferred, and an acryloyloxyalkyloxy group having 3 to 11 carbon atoms is particularly preferred.

Examples of the above-described methacryloyloxyalkyloxy group having 4 to 15 carbon atoms in total include a methacryloyloxy group, a methacryloyloxyethyloxy group, a methacryloyloxyhexyloxy group, and the like, and, among these, a methacryloyloxyalkyloxy group having 4 to 14 carbon atoms is preferred, and a methacryloyloxyalkyloxy group having 4 to 12 carbon atoms is particularly preferred.

The molecular weight of the above-described photoreactive optically active compound represented by General Formula (I) is preferably 300 or higher. In addition, a photoreactive optically active compound having a high solubility with a liquid crystalline compound described below is preferred, and a photoreactive optically active compound having a solubility parameter (SP) value approximating to that of the liquid crystalline compounds is more preferred.

The liquid crystal composition preferably at least includes at least one kind of the above-described photoreactive chiral agent and further includes at least one kind of liquid crystalline compound (preferably a nematic liquid crystal compound), and the above-described liquid crystalline compound may or may not have a polymerizable group. In addition, the liquid crystal composition may include other components such as a polymerizable monomer, a polymerization initiator, a binder resin, a solvent, a surfactant, a polymerization inhibitor, a viscosity improver, a coloring agent, a pigment, an ultraviolet absorber, and a gelating agent as necessary. In the liquid crystal composition, it is preferable to jointly use, particularly, a surfactant. For example, in a case in which a layer is formed by applying a coating liquid-form liquid crystal composition or the like, it is possible to sterically control the orientation state in an air interface of the layer surface and obtain selective reflection wavelengths having a higher color purity.

The content of the photoreactive chiral agent in the liquid crystal composition is not particularly limited, can be appropriately selected, and is preferably approximately 2 to 30% by mass.

The liquid crystalline compound can be appropriately selected from liquid crystal compounds, high-molecular-weight liquid crystal compounds, and polymerizable liquid crystal compounds which have a refractive index anisotropy An in a range of 0.10 to 0.40. Examples thereof include smectic liquid crystal compounds, nematic liquid crystal compounds, and the like, and, among these, a nematic liquid crystal compound is preferred. For example, when a nematic liquid crystal compound is used as the liquid crystalline compound, and the above-described photoreactive chiral agent represented by General Formula (I) is jointly used with the nematic liquid crystal compound, it is possible to produce a cholesteric liquid crystal composition (cholesteric liquid crystal phase). The above-described liquid crystalline compound can be oriented using, for example, an orientation substrate which has been subjected to a rubbing treatment while being in a liquid crystal state during melting. In addition, in order to fix the liquid crystalline compound by turning the liquid crystal state into a solid phase, it is possible to use means such as cooling or polymerization.

Meanwhile, as the λ/4 plate 48, a well-known λ/4 plate can be appropriately used.

In the liquid crystal display device 10b of the present embodiment, the unpolarized light $L_B$ emitted from the backlight 12 is converted to circularly polarized light $L_{CL}$ using the cholesteric liquid crystal layer 46, and the circularly polarized light $L_{CL}$ is converted to linearly polarized light $L_{BP}$ using the λ/4 plate 48. The linearly polarized light $L_{BP}$ is incident on the quantum rod sheet 16, and is, similar to in the liquid crystal display device 10 of the first embodiment, is optically converted to green linearly polarized light $L_{GP}$ and red linearly polarized light $L_{RP}$, and blue linearly polarized light $L_{BP}$, green linearly polarized light $L_{GP}$, and red linearly polarized light $L_{RP}$ can be obtained.

The liquid crystal display device 10b of the present embodiment is capable of obtaining the same effect as that of the liquid crystal display device 10 of the first embodiment.

Meanwhile, in a case in which the cholesteric liquid crystal layer 46 is used, it is possible to efficiently extract the circularly polarized light $L_{CL}$ from the unpolarized light $L_B$, which is preferable. When the cholesteric liquid crystal layer is combined with the λ/4 plate 48, it is possible to increase the efficiency of converting the unpolarized light $L_B$ to the linearly polarized light $L_{BP}$.

The present invention is basically constituted as described above. Hitherto, the liquid crystal display device of the present invention has been described in detail, but the present invention is not limited to the above-described embodiments, and it is needless to say that the embodiments may be improved or modified in various manners within the scope of the gist of the present invention.

EXAMPLES

Hereinafter, the characteristics of the present invention will be more specifically described using examples and comparative examples. Materials, amount used, proportions, processing contents, processing orders, and the like which will be described in the following examples can be appropriately changed within the scope of the gist of the present invention. Therefore, the scope of the present invention is not supposed to be limitedly interpreted by specific examples described below.

In the present examples, liquid crystal display devices of Examples 1 to 7 illustrated in FIGS. 10A to 10G and a liquid crystal display device of Comparative Example 1 illustrated in FIG. 10H were produced, and the front surface brightness and the front surface hue were measured. The results are shown in Table 1 below.

Regarding the front surface brightness and the front surface hue, the front surface brightness refers to the value of L. The front surface hue refers to the values of u' and v' in CIE 1976 UCS chromaticity diagram.

Meanwhile, the front surface brightness and the front surface hue are values obtained by measuring brightness and hue from the front surface during the input of white signals using a brightness colorimeter BM-5A (manufactured by Topcon Technohouse Corporation). The front surface brightness in Examples 1 to 7 were standardized using the front surface brightness in Comparative Example 1 as 100.

Example 1

Hereinafter, Example 1 will be described.
<Production of Liquid Crystal Display Device>

A commercially available liquid crystal display device (manufactured by Panasonic Corporation, trade name: TH-L42D2) was disassembled, and the backlight unit was changed to the following B narrow-bandwidth backlight unit, thereby producing a liquid crystal display device.

The B narrow-bandwidth backlight unit used included a blue light emission diode (NICHIA B-LED: Royal Blue, main wavelength: 445 nm, and half-value width: 20 nm) as the light source. In addition, a reflection member that reflected light which has been emitted from the light source and reflected by an optical sheet member is provided at the rear portion of the light source.
<Production of Quantum Rod Sheet>

As an optical conversion member, with reference to the specification of US2005/0211154A, a dissertation (Peng, X. G.; Manna, L.; Yang, W. D.; Wickham, j.; Scher, E.; Kadavanich, and A.; Alivisatos, A. P. Nature 2000, 404, 59 to 61), and a dissertation (Manna, L.; Scher, E. C.; and Alivisatos, A. P. j. Am. Chem. Soc. 2000, 122, 12700 to 12706), quantum rods 1 that fluorescently emitted green light having a central wavelength of 540 nm and a half-value width of 40 nm and quantum rods 2 that fluorescently emitted red light having a central wavelength of 645 nm and a half-value width of 30 nm when blue light was incident thereon from the blue light emission diode were formed. The shape of the quantum rods 1 and 2 was a cubic shape, and the average value of the lengths of the long axes of the quantum rods was 30 nm Meanwhile, the average value of the lengths of the long axes of the quantum rods was confirmed using a transmission electron microscope.

Next, a quantum rod sheet in which the quantum rods 1 and 2 were dispersed was produced using the following method.

As a base material, a sheet of isophthalic acid-copolymerized polyethylene terephthalate into which 6% by mol of isophthalic acid had been copolymerized (hereinafter, referred to as "amorphous PET") was produced. The glass transition temperature of the amorphous PET is 75° C. A laminate made up of the amorphous PET base material and a quantum rod orientation layer was produced in the following manner. Here, the quantum rod orientation layer includes the produced quantum rods 1 and 2 in a matrix of polyvinyl alcohol (hereinafter, referred to as "PVA"). That is, the glass transition temperature of PVA is 80° C.

A quantum rod-containing PVA aqueous solution in which PVA powder having a degree of polymerization of 1,000 or higher and a degree of saponification of 99% or higher (the concentration: 4% to 5%) and the quantum rods 1 and 2 produced above (the respective concentrations of 1%) were dissolved in water was prepared. In addition, a 200 μm-thick amorphous PET base material was prepared. Next, the quantum rod-containing PVA aqueous solution was applied onto the above-described 200 μm-thick amorphous PET base material and was dried at a temperature in a range of 50° C. to 60° C., thereby forming a 25 μm-thick quantum rod-containing PVA layer on the amorphous PET base material. A laminate of this amorphous PET and the quantum rod-containing PVA will be referred to as a quantum rod sheet.

<Production of Reflective Polarizing Plate 1>

With reference to JP1997-506984A (JP-H09-506984A), refractive index anisotropic layers and refractive index isotropic layers were alternately laminated so as to reflect light having a wavelength in a range of 430 to 490 nm, thereby producing a reflective polarizing plate.

Specifically, the in-plane refractive index of a refractive index anisotropic layer 1 is 1.8 or lower in the maximum direction nx and 1.5 or lower in the minimum direction ny, and nx and ny are substantially orthogonal to each other. In addition, the in-plane refractive index n of a refractive index isotropic layer 1 was 1.5. In addition, the refractive index anisotropic layer 1 and the refractive index isotropic layer 1 were produced so as to respectively have film thicknesses of 53 nm and 85 nm The film thicknesses and the refractive indexes were measured using FE3000 (manufactured by Otsuka Electronics Co., Ltd.). Thirty refractive index anisotropic layers and thirty refractive index isotropic layer were alternately laminated so as to form a total of 60 layers.

At this time, the refractive index anisotropic layers were laminated together so as to have directions in which the in-plane refractive index thereof was maximized substantially parallel to each other in all of the layers.

<Disposition of Reflective Polarizing Plate 1>

The reflective polarizing plate was disposed between the backlight and the quantum rod sheet so that the directions in which the in-plane refractive index of the refractive index anisotropic layer in the reflective polarizing plate 1 produced above was maximized became orthogonal to the transmission axis of a backlight-side polarizing plate, thereby obtaining a liquid crystal display device illustrated in FIG. 10A.

Example 2

Example 2 is different from Example 1 that a wire grid-type reflective polarizing plate 2 was provided instead of the reflective polarizing plate 1 and is identical to Example 1 in the other constitutions, and thus detailed description thereof will not be made.

<Production of Reflective Polarizing Plate 2>

As a reflective polarizing plate 2, with reference to Example 1 in JP2005-195824A, a wire grid polarizing plate was produced.

<Disposition of Reflective Polarizing Plate 2>

The reflective polarizing plate was disposed between a backlight and the quantum rod sheet so that the wire direction of the reflective polarizing plate 2 produced above and the transmission axis of the backlight-side polarizing plate were orthogonal to each other, thereby obtaining a liquid crystal display device illustrated in FIG. 10B.

Example 3

Example 3 is different from Example 1 that a reflective polarizing plate 3 including high-refractive-index layers and low-refractive-index layers was provided instead of the reflective polarizing plate 1 and is identical to Example 1 in the other constitutions, and thus detailed description thereof will not be made.

<Production of Reflective Polarizing Plate 3>

(1) Production of Protective Film (Preparation of Core Layer Cellulose Acylate Dope 1)

The following composition was injected into and stirred in a mixing tank, and individual components were dissolved, thereby preparing a core layer cellulose acylate dope 1. The molecular weight of the following compound 1-1 is a weight-average molecular weight computed using gel permeation chromatography (GPC) by means of a method described in Paragraph "0037" of WO2008-126535A. That is, for polymers and copolymers, the molecular weights are weight-average molecular weights which are measured by means of gel permeation chromatography (GPC) and are obtained by means of standard polystyrene conversion.

| | |
|---|---|
| Cellulose acetate having an acetyl substitution degree of 2.88 | 100 parts by mass |
| Ester oligomer (Compound 1-1) | 10 parts by mass |
| Durability improver (Compound 1-2) | 4 parts by mass |
| Ultraviolet absorber (Compound 1-3) | 3 parts by mass |
| Methylene chloride (first solvent) | 438 parts by mass |
| Methanol (second solvent) | 65 parts by mass |

(Compound 1-1)

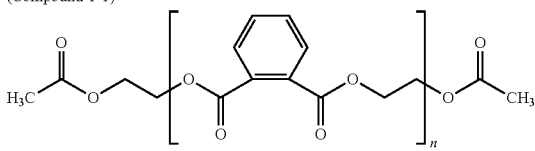

Molecular weight 1,000
(Compound 1-2)

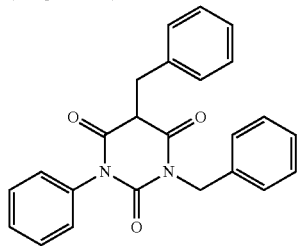 [SMILES: O=C1C(Cc2ccccc2)C(=O)N(c2ccccc2)C(=O)N1Cc1ccccc1]

(Compound 1-3)

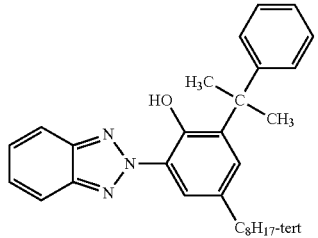

<Preparation of Outer Layer Cellulose Acylate Dope 1>

The following matting agent dispersion liquid 1 (10 parts by mass) was added to the above-described core layer cellulose acylate dope 1 (90 parts by mass), thereby preparing an outer layer cellulose acylate dope 1.

<Matting Agent Dispersion Liquid 1>

| | |
|---|---|
| Silica particles having an average particle size of 20 nm (AEROSIL R972, manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope 1 | 1 part by mass |

A layer of the above-described core layer cellulose acylate dope 1 and three layers of the outer layer cellulose acylate dope 1 on both sides of the above-described layer were cast on a drum (20° C.) from a casting opening at the same time. The film was peeled off in a state of having a solvent content ratio of approximately 20% by mass, both ends of the film in the width direction were fixed using tenter clips, and the film was stretched 1.2 times in the horizontal direction and dried in a state of including 3% to 15% by mass of the residual solvent. After that, the film was transported between rolls in a thermal treatment apparatus, thereby producing a 25 μm-thick cellulose acylate film and using this film as a protective film.

<Production of Low-Refractive-Index Protrusions and Recesses>

Preparation of coating liquid for forming low-refractive-index layer (ultraviolet ray-curable composition)

The following components were injected into and stirred in a mixing tank, thereby preparing a composition.

| | |
|---|---|
| Pentaerythritol tetraacrylate [A-TMMT manufactured by Shin-Nakamura Chemical Co., Ltd.] | 100.0 parts by mass |
| Polymerization initiator [IRGACURE (registered trademark) 127 manufactured by BASF] | 3.0 parts by mass |
| Methyl ethyl ketone | 103.7 parts by mass |

The coating liquid for forming a low-refractive-index layer (ultraviolet ray-curable composition) prepared above was applied onto the surface of the protective film obtained above using a die coating method in which a slot die was used and which is described in Example 1 of JP2006-122889A under a condition of a transportation speed of 24 m/minute and was dried at 60° C. for 60 seconds.

After that, while being pressed by an isosceles triangle-shaped protrusion and recess roller having a top angle of 45 degrees and a height of 5 μm, the applied layer was cured by being irradiated with ultraviolet rays at an illuminance of 400 mW/cm$^2$ and an illuminance amount of 390 mJ/cm$^2$ using a 160 W/cm air-cooling metal halide lamp (manufactured by eye Graphics Co., Ltd.) under nitrogen purging (at an oxygen concentration of approximately 0.1%), thereby producing a low-refractive-index layer (cured layer) having an uneven shape on the surface.

<Production of High-Refractive Index Anisotropic Layer>

Subsequently, a solvent having the following composition was dissolved in methyl ethyl ketone (MEK), thereby preparing a coating liquid.

(Solvent composition in coating liquid for forming high-refractive index anisotropic layer)

| | |
|---|---|
| Disk-like liquid crystal compound (Compound 101 described below) | 35 parts by mass |
| Disk-like liquid crystal compound (Compound 102 described below) | 35 parts by mass |
| Orientation aid (Compound 4) | 1 part by mass |
| Orientation aid (Compound 5) | 1 part by mass |
| Polymerization initiator (Compound 6) | 3 parts by mass |

Compound 101

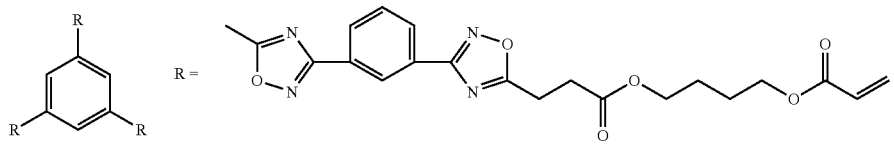

Compound 102

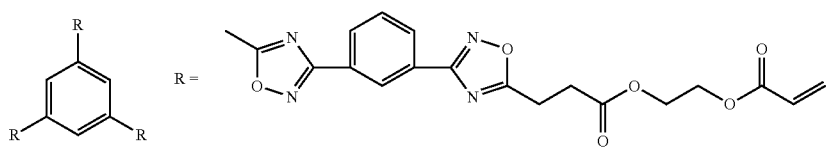

-continued

Compound 4 (a mixture of two compounds in which the substitution locations of a methyl group in a trimethyl-substituted benzene ring are different in the following structure, the mixing ratio between the two compounds is 50:50 (mass ratio))

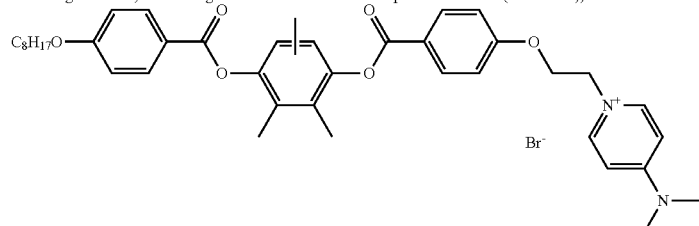

Compound 5

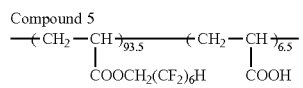

Compound 6

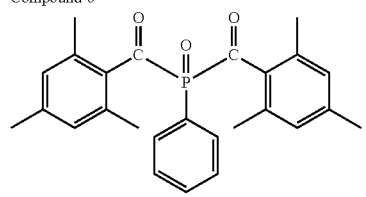

<Application of Orientation Film>

As an orientation layer, a solution obtained by dissolving POVAL PVA-103 manufactured by Kuraray Co., Ltd. in pure water and then adjusting the concentration so that the dried film thickness reached 0.5 μm was bar-applied onto the low-refractive index layer and then was heated at 100° C. for five minutes. Furthermore, a rubbing treatment was carried out on the surface.

<Application of High-Refractive Index Anisotropic Layer>

Next, the produced solution for a high-refractive index anisotropic layer was applied onto the above-described orientation film by means of bar coating in a thickness at which protrusions and recesses on a prism were fully buried. After that, the solvent was gasified by being held at 85° C. for two minutes, and then the coating was heated and aged at 100° C. for four hours.

Figure 11A:
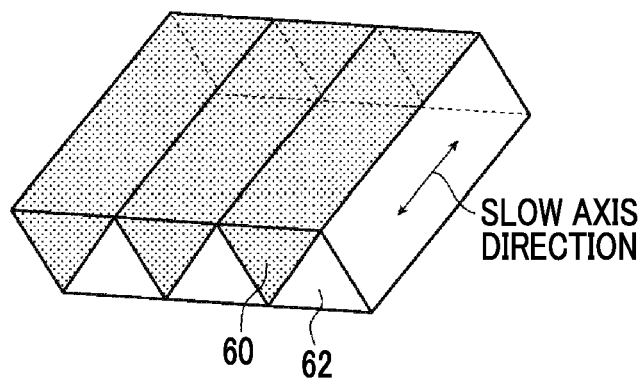
FIG. 11A is a schematic perspective view for describing a manufacturing direction of a reflective polarizing plate including a high-refractive-index layer and a low-refractive-index layer.

After that, this coated film was held at 80° C. and was irradiated with ultraviolet rays in a nitrogen atmosphere using a high-pressure mercury lamp. As illustrated in FIG. 11A, the slow axis was along the prism shape.

<Disposition of Reflective Polarizing Plate 3>

Figure 11B:
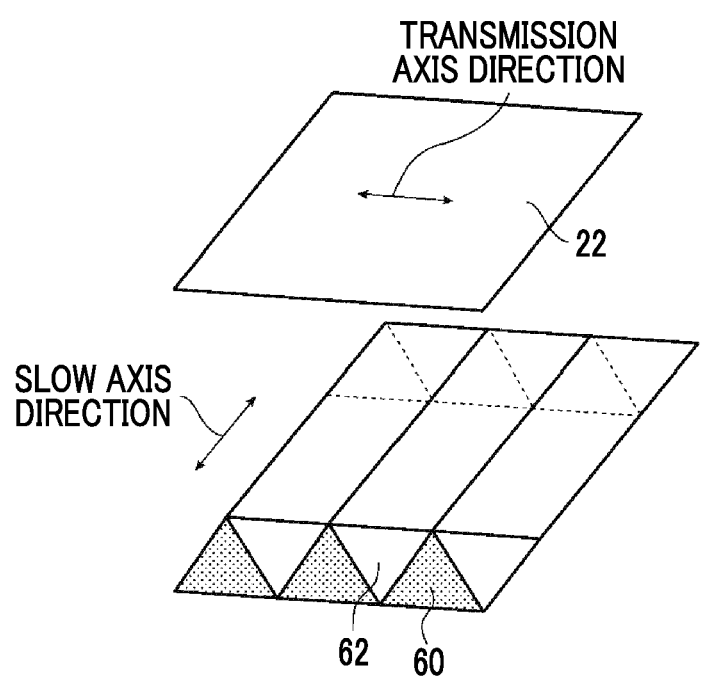
FIG. 11B is a schematic perspective view illustrating the disposition state of the reflective polarizing plate including the high-refractive-index layer and the low-refractive-index layer.

As illustrated in FIG. 11B, the reflective polarizing plate was disposed between the backlight and the quantum rod sheet by making the prism direction, that is, the slow axis direction of the reflective polarizing plate 3 produced above and the transmission axis direction of the backlight-side polarizing plate orthogonal to each other, thereby obtaining a liquid crystal display device illustrated in FIG. 10C. At this time, the high-refractive index layer was disposed on the backlight side.

Example 4

Example 4 is different from Example 1 that a λ/4 plate and a reflective polarizing plate 4 were provided instead of the reflective polarizing plate 1 and is identical to Example 1 in the other constitutions, and thus detailed description thereof will not be made.

<Formation of Blue Light Reflection Layer>

A solvent having the following composition was dissolved in methyl ethyl ketone (MEK) at a concentration adjusted so as to obtain a dried film thickness of 1.7 μm, and a coating liquid for forming a blue light reflection layer including a rod-like liquid crystal compound was prepared. This coating liquid was bar-applied onto the protective film in Example 3 and was heated and aged at 85° C. for one minute, thereby obtaining a uniform orientation state. After that, the applied film was held at 45° C. and was irradiated with ultraviolet rays at 300 mJ/cm² using a metal halide lamp, thereby producing the reflective polarizing plate 4.

(Solvent Composition in Clockwise-Rotating Blue Light Reflection Layer Coating Liquid)

| | |
|---|---|
| Compound 11 | 83 parts by mass |
| Rod-like compound 18-1 | 15 parts by mass |
| Rod-like compound 18-2 | 2 parts by mass |
| Fluorine-based horizontal orientation agent 1 | 0.05 parts by mass |
| Fluorine-based horizontal orientation agent 2 | 0.01 parts by mass |
| Clockwise-rotating chiral agent LC756 (manufactured by BASF) | 6.9 parts by mass |
| Polyfunctional monomer A-TMMT (manufactured by Shin-Nakamura Chemical Co., Ltd.) | 1 part by mass |
| Polymerization initiator IRGACURE (registered trademark) 819 (manufactured by BASF) | 3 parts by mass |

Compound 11

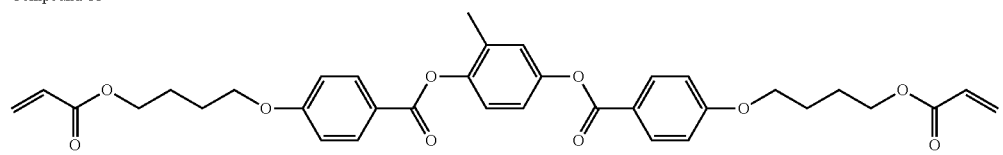

-continued

Rod-like compound 18-1

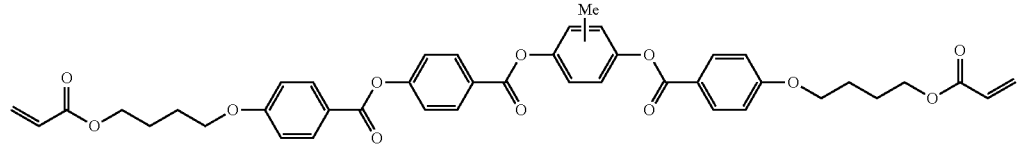

Rod-like compound 18-2

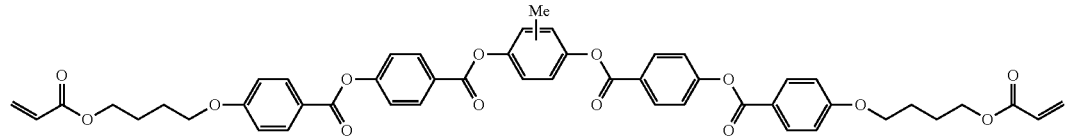

Fluorine-based horizontal orientation agent 1

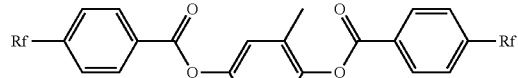

Fluorine-based horizontal orientation agent 2

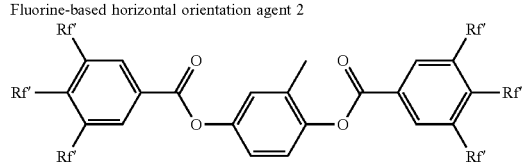

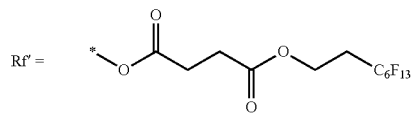

<Production of λ/4 Plate>

As an orientation layer, a solution obtained by dissolving POVAL PVA-103 manufactured by Kuraray Co., Ltd. in pure water and then adjusting the concentration so that the dried film thickness reached 0.5 μm was applied onto the protective film in Example 3 by means of bar coating and then was heated at 100° C. for five minutes. Furthermore, a rubbing treatment was carried out on the surface.

Subsequently, a solvent having the following composition was dissolved in MEK at a concentration adjusted so as to obtain a dried film thickness of 1 μm, thereby preparing a coating liquid. This coating liquid was applied onto the above-described orientation layer by means of bar coating, the solvent was gasified by being held at 85° C. for two minutes, and then the coating was heated and aged at 100° C. for four hours, thereby obtaining a uniform orientation state. Meanwhile, the disk-like compound was vertically oriented with respect to the plane of a support.

After that, this applied film was held at 80° C. and was irradiated with ultraviolet rays in a nitrogen atmosphere using a high-pressure mercury lamp, thereby forming a λ/4 plate.

(Solvent Composition in Coating Liquid for Forming λ/4 Plate)

| | |
|---|---|
| Disk-like liquid crystal compound (Compound 101) | 35 parts by mass |
| Disk-like liquid crystal compound (Compound 102) | 35 parts by mass |
| Orientation aid (Compound 4) | 1 part by mass |
| Orientation aid (Compound 5) | 1 part by mass |
| Polymerization initiator (Compound 6) | 3 parts by mass |

<Disposition of Reflective Polarizing Plate 4>

The reflective polarizing plate 4 produced above was disposed in an order of the backlight, the reflective polarizing plate 4, the λ/4 plate, the quantum rod sheet, and the backlight-side polarizing plate from the backlight side, thereby obtaining a liquid crystal display device illustrated in FIG. 10D.

Example 5

Example 5 is different from Example 1 that the following λ/4 plate was disposed between the reflective polarizing plate 1 and the backlight and is identical to Example 1 in the other constitutions, and thus detailed description thereof will not be made. In Example 5, the λ/4 plate was disposed so that the slow axis of the λ/4 plate and the directions in which the in-plane refractive index of the refractive index anisotropic layers in the reflective polarizing plate 1 were maximized formed approximately 45 degrees, thereby obtaining a liquid crystal display device illustrated in FIG. 10E.

Example 6

Example 6 is different from Example 2 that a λ/4 plate was disposed between the reflective polarizing plate 2 and the backlight and is identical to Example 2 in the other constitutions, and thus detailed description thereof will not be made. In Example 6, the λ/4 plate was disposed so that the slow axis of the λ/4 plate and the wire direction of the reflective polarizing plate 2 formed approximately 45 degrees, thereby obtaining a liquid crystal display device illustrated in FIG. 10F.

Example 7

Example 7 is different from Example 3 that a λ/4 plate was disposed between the reflective polarizing plate 3 and the backlight and is identical to Example 3 in the other constitutions, and thus detailed description thereof will not be made. In Example 7, the λ/4 plate was disposed so that the slow axis of the λ/4 plate and the slow axis direction of the reflective polarizing plate 3 formed approximately 45 degrees, thereby obtaining a liquid crystal display device illustrated in FIG. 10G.

Comparative Example 1

Comparative Example 1 is different from Example 1 that the reflective polarizing plate 1 was not provided (refer to FIG. 10H) and is identical to Example 1 in the other constitutions, and thus detailed description thereof will not be made.

TABLE 1

|  | Front surface brightness | Front surface hue | |
| --- | --- | --- | --- |
|  | L | u' | v' |
| Example 1 | 121 | 0.20 | 0.47 |
| Example 2 | 121 | 0.20 | 0.47 |
| Example 3 | 123 | 0.20 | 0.47 |
| Example 4 | 122 | 0.20 | 0.47 |
| Example 5 | 125 | 0.20 | 0.47 |
| Example 6 | 125 | 0.20 | 0.47 |
| Example 7 | 128 | 0.20 | 0.47 |
| Comparative Example 1 | 100 | 0.20 | 0.47 |

As shown in Table 1, the front hue is identical in Examples 1 to 7 and Comparative Example 1. In Examples 1 to 7, the use efficiencies of the backlight were higher than that in Comparative Example 1, and the front surface brightness was higher than that in Comparative Example 1. In addition, in Examples 5 to 7 provided with the λ/4 plate, the use efficiencies of the backlight are higher than those in Examples 1 to 4, and it is possible to further increase the front surface brightness.

EXPLANATION OF REFERENCES

10, 10a, 10b, 100: liquid crystal display device
12: backlight
14, 44: reflective polarizing plate
16: quantum rod sheet
18: liquid crystal panel
20: liquid crystal cell
22: backlight-side polarizing plate
24: viewer-side polarizing plate
30, 34, 36, 40: polarizing plate protective film
42, 48: λ/4 plate
46: cholesteric liquid crystal layer
60: high-refractive index layer

What is claimed is:

1. A liquid crystal display device comprising:
a backlight that emits =polarized blue light;
a reflective polarizing layer which is provided on an emission side of the backlight and converts blue light to linearly polarized light;
a quantum rod layer which is provided on a blue linearly polarized light emission side of the reflective polarizing layer and converts blue linearly polarized light to red linearly polarized light and green linearly polarized light using multiple quantum rods; and
a liquid crystal panel disposed on a red linearly polarized light and green linearly polarized light emission side,
wherein a polarization direction of the blue linearly polarized light emitted from the reflective polarizing layer and a long axis direction of the quantum rods arc parallel to each other in the quantum rod layer.

2. The liquid crystal display device according to claim 1, wherein the reflective polarizing layer transmits light that is linearly polarized in a direction parallel to the long axis direction of the quantum rods and reflects light that is linearly polarized in a direction orthogonal to the long axis direction of the quantum rods.

3. The liquid crystal display device according to claim 2, wherein the reflective polarizing layer is a reflective polarizing layer in which resins having different refractive indexes are laminated together.

4. The liquid crystal display device according to claim 2, wherein the reflective polarizing layer has an interface having a varying refractive index, and
a shape of the interface includes an uneven shape formed of protrusion portions and recess portions.

5. The liquid crystal display device according to claim 1, wherein the reflective polarizing layer includes a cholesteric liquid crystal layer and a λ/4 plate disposed on a quantum rod layer side of the cholesteric liquid crystal layer.

6. The liquid crystal display device according to claim 1, wherein a λ/4 plate is provided between the backlight and the reflective polarizing layer.

7. The liquid crystal display device according to claim 2, wherein a λ/4 plate is provided between the backlight and the reflective polarizing layer.

8. The liquid crystal display device according to claim 3, wherein a λ/4 plate is provided between the backlight and reflective polarizing layer.

9. The liquid crystal display device according to claim 4, wherein a λ/4 plate is provided between the backlight and the reflective polarizing layer.

* * * * *